(12) United States Patent
Gorin et al.

(10) Patent No.: US 10,129,556 B2
(45) Date of Patent: Nov. 13, 2018

(54) SYSTEMS AND METHODS FOR ACCESSING DIGITAL DATA

(71) Applicant: Bevara Technologies, LLC, Belmont, MA (US)

(72) Inventors: Jerome Gorin, Paris (FR); Maja Bystrom, Belmont, MA (US)

(73) Assignee: Bevara Technologies, LLC, Watertown, MA (US)

( * ) Notice: Subject to any disclaimer, the term of this patent is extended or adjusted under 35 U.S.C. 154(b) by 993 days.

(21) Appl. No.: 14/280,499

(22) Filed: May 16, 2014

(65) Prior Publication Data

US 2015/0334413 A1 Nov. 19, 2015

(51) Int. Cl.
| | | |
|---|---|---|
| *H04N 19/46* | (2014.01) | |
| *H04N 19/85* | (2014.01) | |
| *H04N 19/44* | (2014.01) | |
| *H04N 19/70* | (2014.01) | |
| *H04N 21/236* | (2011.01) | |
| *H04N 21/81* | (2011.01) | |
| *H04N 21/854* | (2011.01) | |

(52) U.S. Cl.
CPC ............ *H04N 19/46* (2014.11); *H04N 19/44* (2014.11); *H04N 19/70* (2014.11); *H04N 19/85* (2014.11); *H04N 21/23614* (2013.01); *H04N 21/8166* (2013.01); *H04N 21/8193* (2013.01); *H04N 21/85406* (2013.01)

(58) Field of Classification Search
CPC ...... H04N 19/70; H04N 21/442; H04N 19/44; H04N 19/46; H04N 19/85
See application file for complete search history.

(56) References Cited

U.S. PATENT DOCUMENTS

| | | |
|---|---|---|
| 5,987,181 A | 11/1999 | Makiyama et al. |
| 6,181,711 B1 | 1/2001 | Zhang et al. |
| 6,624,761 B2 | 9/2003 | Fallon |
| 7,512,986 B2 | 3/2009 | Shen-Orr et al. |

(Continued)

FOREIGN PATENT DOCUMENTS

| | | |
|---|---|---|
| EP | 1562193 A1 | 8/2005 |
| EP | 1818907 A1 | 8/2007 |
| EP | 1912129 A2 | 4/2008 |
| WO | WO 2005/046058 | 5/2005 |
| WO | WO 2008/127080 | 10/2008 |

OTHER PUBLICATIONS

Chen et al., "Active Techniques for Real-time Video Transmission and Playback", 2000 International Conference on Communications, New Orleans, LA Jun. 18-21, 2000 IEEE New York, NY; pp. 239-243.

Ding et al., "Reconfigurable video coding framework and decoder reconfiguration instantiation of AVS", Signal Processing, Image Communication, (2009) 24(4): 287-299.

(Continued)

*Primary Examiner* — Obafemi O Sosanya
(74) *Attorney, Agent, or Firm* — Veros Legal Solutions, LLP

(57) ABSTRACT

Disclosed are methods and systems for encoding and decoding a container. The container contains one or more accessors for content included in the container. An accessor implements an algorithm for accessing the content. In some aspects, the algorithm may be implemented via intermediate or source code defined in the container. In one aspect, a method of encoding a container includes encoding first content in the container, encoding first accessor data in the container, the first accessor data implementing a platform independent algorithm for accessing first content; and writing the container to a device.

21 Claims, 13 Drawing Sheets

(56) References Cited

U.S. PATENT DOCUMENTS

| | | | |
|---|---|---|---|
| 7,646,432 | B2 | 1/2010 | Park et al. |
| 7,647,619 | B2 | 1/2010 | Kashima |
| 8,995,534 | B2 | 3/2015 | Richardson et al. |
| 9,578,078 | B2 | 2/2017 | Bystrom et al. |
| 9,667,685 | B2 | 5/2017 | Bystrom et al. |
| 2002/0010859 | A1 | 1/2002 | Maeda |
| 2002/0018580 | A1 | 2/2002 | Maeda |
| 2002/0035544 | A1 | 3/2002 | Wakao et al. |
| 2002/0087999 | A1 | 7/2002 | Kashima |
| 2003/0163430 | A1 | 8/2003 | Takaku |
| 2003/0193940 | A1 | 10/2003 | Kugumiya |
| 2004/0028141 | A1 | 2/2004 | Hsiun et al. |
| 2004/0067043 | A1 | 4/2004 | Duruoz et al. |
| 2004/0221143 | A1 | 11/2004 | Wise et al. |
| 2006/0056506 | A1 | 3/2006 | Ho et al. |
| 2006/0087457 | A1 | 4/2006 | Rachwalski et al. |
| 2006/0116966 | A1 | 6/2006 | Pedersen et al. |
| 2006/0123455 | A1 | 6/2006 | Pai et al. |
| 2006/0227815 | A1 | 10/2006 | Khan |
| 2006/0248235 | A1 | 11/2006 | Eyer |
| 2007/0013562 | A1 | 1/2007 | Nagasawa |
| 2007/0200658 | A1 | 8/2007 | Yang |
| 2007/0274340 | A1 | 11/2007 | Raveendran et al. |
| 2007/0296613 | A1 | 12/2007 | Hussain et al. |
| 2008/0027953 | A1 | 1/2008 | Morita et al. |
| 2008/0052540 | A1 | 2/2008 | Inokuchi et al. |
| 2008/0066181 | A1 | 3/2008 | Haveson et al. |
| 2008/0181400 | A1 | 7/2008 | Guleryuz et al. |
| 2008/0243995 | A1 | 10/2008 | Dong et al. |
| 2008/0252490 | A1 | 10/2008 | Chiluk et al. |
| 2008/0294691 | A1 | 11/2008 | Chang et al. |
| 2009/0016446 | A1 | 1/2009 | Yang et al. |
| 2009/0110067 | A1 | 3/2009 | Sekiguchi et al. |
| 2009/0086104 | A1 | 4/2009 | Felder et al. |
| 2009/0142038 | A1 | 6/2009 | Nishikawa |
| 2009/0154556 | A1 | 6/2009 | Kim et al. |
| 2009/0304115 | A1 | 12/2009 | Pittaway et al. |
| 2009/0310671 | A1 | 12/2009 | Reynolds et al. |
| 2009/0313300 | A1 | 12/2009 | Dettori et al. |
| 2010/0027974 | A1 | 2/2010 | Ansari |
| 2010/0046627 | A1 | 2/2010 | Xiao et al. |
| 2010/0195820 | A1 | 8/2010 | Frank |
| 2011/0061086 | A1 | 3/2011 | Huang |
| 2012/0069910 | A1 | 3/2012 | Richardson et al. |
| 2012/0069911 | A1 | 3/2012 | Richardson et al. |
| 2012/0072225 | A1 | 3/2012 | Richardson et al. |
| 2012/0250757 | A1 | 10/2012 | Mabey et al. |
| 2012/0323758 | A1 | 12/2012 | Henning |
| 2013/0103786 | A1 | 4/2013 | Miglore |
| 2013/0188739 | A1 | 7/2013 | Bystrom et al. |
| 2013/0195171 | A1 | 8/2013 | Wang et al. |
| 2014/0126883 | A1 | 5/2014 | Yogeshwar et al. |
| 2014/0317668 | A1* | 10/2014 | Zhang ............... H04N 21/442 725/116 |
| 2014/0380113 | A1* | 12/2014 | Luby ............... H04N 21/23106 714/752 |
| 2015/0195325 | A1 | 7/2015 | Bystrom et al. |
| 2016/0277472 | A1 | 9/2016 | Bystrom et al. |

OTHER PUBLICATIONS

Jang et al., "Reshaping Digital Media Business Models by Reconfigurable Video Coding", 78. MPEG Meeting; Oct. 23-Oct. 27, 2006; Hangzhou, CN; (Motion Picture Expert Group or ISA/IEC JTC1/SC29/WG11); No. M13907, 5 pages.

Zhao et al., "A Random Access Protocol for Configurable Video Coding", 90th MPEG Meeting; Oct. 26-Oct. 30, 2009; Xian,CN; (Motion Picture Expert Group or ISO/IEC JTC1/SC29/WG11), No. M16927; 15 pages.

Partial International Search Report issued in International Patent Application No. PCT/US2015/030525 dated Jul. 27, 2015.

International Search Report and the Written Opinion issued in International Patent Application No. PCT/US2015/030525 dated Oct. 27, 2015.

Angus, Andrew. "DropboX: Video Sharing and Photo Sharing Made Easy" [blog post] http://www.switchvideo.com/blog/2011/05/09/dropbox-video-sharing-and-photo-sharing-madeeasy/ May 9, 2011 (May 9, 2011) Switch Video. Retrieved on Mar. 14, 2013.

Avaro et al., "The MPEG-4 Systems and Description Language :A Way Ahead in Audio Visual Information Representation", Signal Processing: Image Communication (1997) 9(4):385-431.

Bystrom et al., "A Fully Re-Configurable Universal Video Decoder", Conference on Design & Architectures for Signal & Image Processing (DASIP) 2009, 7 pages.

European Telecommunications Standards Institute, Technical Specifications: Hybrid Broadcast Broadband TV, ETSI TS 102 796, (2012); 88 pages.

Gorin et al., "Just-in-Time Adaptive Decoder Engine: A Universal Video Decoder based on MPEG RVC", Proc $19^{th}$ ACM Inter'l Conference on Multimedia, New York; NY—USA (2011), 4 pages.

Gorin et al., "Optimized dynamic compilation of dataflow representations for multimedia applications", Annal Telecommun, Springer Verlag (2013) 68(3-4):133-151.

ISO/IEC 14496-12 Information technology—Coding of audio-visual objects—Part 12 ISO base media file format; International Organization for Standardization—$4^{th}$ Edition (2012); 196 pages.

ISO/IEC 14496-14 Information technology—Coding of audio-visual objects—Part 14 MP4 file format; International Organization for Standardization—$1^{st}$ Edition (2003); 18 pages.

Kannangara et al., "A Syntax for Defining, Communicating, and Implementing Video Decoder Function and Structure" IEEE Transactions on Circuits & Systems for Video Tech. (2010) 20(9):1176-1186.

OneCodec. "OneCodec: Future proof your media." (online) Sep. 23, 2011 1-10, 13-15 (Sep. 23, 2011) Available at http://vimeo.com/29476212. Retrieved on Mar. 14, 2013.

Richardson et al., "Dynamic transform replacement in an H.264 CODEC", $15^{th}$ IEEE International Conference on Image Processing (2008) pp. 2108-2111.

Richardson et al., "A Framework for Fully Configurable Video Coding", PCS 2009, 4 pages.

Richardson et al., "Fully Configurable Video Coding—Part 1: Overview of FCVC", ISO/IEC JTCI/SC2O/WG11 document M16751, Jun. 2009, 6 pages.

Richardson et al., "Fully Configurable Video Coding Part 2", ISO/IEC JTCI/SC20/WG11 document M16752, Jun. 2009, (London, UK) 5 pages.

Richardson et al., "Implementing Fully Configurable Video Coding", $16^{th}$ IEEE International Conference on Image Processing (ICIP) Nov. 2009, pp. 765-768.

Philp et al., "Decoder Description Syntax for Fully Configurable Video Coding", ICIP, Nov. 2009.

International Search Report and Written Opinion issued in International Patent Application No. PCT/US2011/052396 dated Jan. 24, 2012.

International Preliminary Report on Patentability issued in International Patent Application No. PCT/US2011/052396 dated Feb. 12, 2013.

International Search Report issued in International Patent Application No. PCT/US2011/052394 dated Feb. 7, 2012.

International Preliminary Report on Patentability issued in International Patent Application No. PCT/US2011/052394 dated Feb. 19, 2013.

International Search Report and the Written Opinion issued in International Patent Application No. PCT/US2013/023019 dated Apr. 12, 2013.

International Search Report dated Jan. 17, 2012 for Application No. PCT/US2011/052401, filed Sep. 20, 2011.

International Preliminary Report on Patentability dated Mar. 22, 2013 for Application No. PCT/US2011/052401, filed Sep. 20, 2011.

Invitation to pay additional fees dated May 6, 2016 in International Application No. PCT/US2015/030525, filed May 13, 2015.

International Preliminary Report on Patentability dated Aug. 3, 2016 for Application No. PCT/US2015/030525, filed May 13, 2015.

* cited by examiner

SYSTEMS AND METHODS FOR ACCESSING DIGITAL DATA

BACKGROUND

Field

The present technology relates to systems and methods for archiving digital data. Specifically, the systems and methods provide for long term storage and retrieval of digital data by storing archived data and a platform independent accessor capable of accessing the archived data together within an archive.

Description of the Related Art

Digital multimedia and general digital data capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, data servers, and the like. Digital devices implement image and video encoding techniques or formats such as JPEG, GIF, RAW, TIFF, PBM, MPEG-2, MPEG-4, and H.264/MPEG-4, Part 10, Advanced Video Coding (AVC), to store, transmit and receive digital images and video efficiently. Digital devices implement audio encoding techniques or formats such as, AAC, MP3, and WAV to store, transmit, and receive digital audio efficiently. Digital devices implement additional data and graphics encoding techniques or formats such as ICES, 3DT, PS, MNG, ODF, HDF5, NetCDF, and SVG. Digital devices implement document, spreadsheet, and presentation formats such as PowerPoint, PDF, Microsoft Word, Microsoft Excel, and the like. Digital devices further implement proprietary data storage formats for storage of scientific or other data.

Digital data are commonly encoded prior to transmission or storage by an encoder, e.g., a server. The encoding typically consists of operations such as compression or organization into a selected format. The digital data may be independently stored or provided to a user. Alternatively, the digital data may be embedded in other digital data. For instance, an image, video, data, or animation may be part of an electronic news article, electronic slideshow, or technical paper. In either case, the digital data must be accessed, that is, decoded or interpreted prior to display or play, by accessors resident on devices such as mobile devices, DVD players, tablets, laptops, computers, dedicated medical equipment, or set top boxes. However, a particular accessor may not support decoding or interpreting of the format used by the encoder. For example, the format used by the encoder may be a legacy format no longer supported or may be a new format that the accessor does not yet support.

Since different access techniques may support different formats, traditionally digital data needed to be encoded in many different formats to support many different decoders/interpreters on different hardware or operating system platforms. For example, a user downloading a compressed audio file from a server through a network such as the Internet may have many devices, such as a mobile phone, a TV set, a laptop, etc. The downloaded content is traditionally in a single format. However, each of the user's devices may be configured to decode a different format. Accordingly, the user may need to download multiple versions of the audio data, each in a different format, for each of the decoders. This leads to bandwidth usage of the network for each version downloaded in addition to storage space on servers and transcoding requirements. Alternatively, the user might download and install a new decoder for each encoder type on each device in order to decode the encoded audio. However, this solution requires that all legacy formats be supported on all devices. As a third alternative, the provider or user may transcode (decode and re-encode) the digital multimedia received from the downloaded format to each format required for each device. However, this requires computational resources to decode the digital multimedia from the received format and re-encode the digital multimedia into the desired format. Further, this requires memory resources to store each copy of the digital multimedia in each of the desired formats. Additionally, decoding and re-encoding of digital data can lead to loss in quality due to both the loss in precision and the fact that decoding and encoding processes for multimedia data are often lossy as opposed to lossless processes. Similar challenges arise when encoding and accessing other types of data, such as documents encoded in different generations of word processing applications or data encoded in proprietary formats.

One potential technique for avoiding transcoding and to adapt to video content, in particular, is to provide switches between pre-determined standardized algorithms and tools as suggested in 1997 in Section 2.2.1 of "The MPEG-4 Systems and Description Language: A Way Ahead in Audio Visual Information Representation," by A. Ovaro, et al. As described in Section 2.2.1.3 of this document, the drawbacks include exhaustive specification of all configurations, difficulty of scaling up with increase in available tools, and challenges in anticipating future codec needs.

Similarly, a system for implementing reconfiguration of video/audio decompression algorithm elements using flexible or fixed libraries at both the encoder and decoder is proposed in Section 2.2.2 of "The MPEG-4 Systems and Description Language: A Way Ahead in Audio Visual Information Representation," by A. Ovaro, et al. and described in more detail in "Whitepaper on Reconfigurable Video Coding (RVC)," ISO/IEC JTCI/SC20/WG11 document N9586, by E. Jang, et al. The proposed RVC method does not store or transmit decompression algorithms, but rather information about which tools to select from a decompression library is transmitted either prior to encoded audio/video transmission or is embedded within the compressed audio/video bitstream. In this solution, the algorithms or portions of the algorithms are stored locally at both the transmitter and the receiver in a standardized Video Tool Library, such that there is no fundamental code transmission. Systems for implementing intermittent configuration of algorithms are described in U.S. Pat. No. 5,987,181 describes decoding tools or algorithms that are selected from local libraries at the decoder through indicators embedded within a compressed bitstream.

Two systems for partially reconfiguring decoders without the use of local libraries at the decoder are given in "Dynamic Replacement of Video Coding Elements," by Bystrom, et al., and in "A Syntax for Defining, Communicating, and Implementing Video Decoder Function and Structure" by Kannangara, et al. The first transmits a tool for an inverse transform at the start of an encoded video frame or transmits a binary patch for replacing code in a decoder as part of the compressed video stream. The latter transmits encoded algorithms or data within the compressed video, using synchronization codes to distinguish between compressed video and encoded algorithms, and adds the encoded algorithms to the decoder or replaces existing algorithms within the decoder.

The RVC project suggests using a pre-defined "iinf" box of an International Organization for Standardization Base Media File Format (ISO-BMFF) container to store reconfiguration instructions. See ISO/IEC JTC1/SC29/WG11 MPEG2011/M21222 (Section 3.1) for more information; however, it does not suggest a method for indicating or accessing the iinf box for non-video/image information. Further, it does not permit multiple sets of instructions, much less fundamental decoding algorithms, and does not accommodate user-supplied metadata. More specifically, the RVC standard relies on a video tool library with the exchanged XML specifying functional unit interconnects. No video decoder can be instantiated with solely the transmitted XML functional unit description. While a decoder employing these solutions can be instantiated based on a transmitted XML functional unit, a receiver/decoder must have a corresponding video tool library installed locally in order to act on the XML.

SUMMARY

The systems, methods, and devices described herein each may have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description" one will understand how the features of this technology provide advantages that include, without being limited thereto, enabling decoders to decode unsupported multimedia formats.

One aspect disclosed is a method of encoding a container. The method includes encoding first content in the container, encoding first accessor data in the container, the first accessor data implementing a platform independent first algorithm for accessing first content, and writing the container to a device. In some aspects the method also includes encoding second accessor data in the container, second accessor data implementing a platform independent second algorithm for accessing first content. In some aspects, the method also includes determining a hash for at least the first accessor data, and encoding the hash in the container. In some aspects, the method also includes determining an accessor version of the first accessor, and encoding the accessor version in the container. In some aspects, determining a version of the first accessor comprises determining a version of codewords included in first accessor data. In some aspects, the method also includes determining a content version of the first content, and encoding the content version in the container. In some aspects, the method also includes selecting a container format for the first content that is one of ISO-BMFF, MP4, Advanced Systems Format, DivX Media Format, EVO, Flash Video, 3GP, 3G2, AVI, MPEG Video File, MPEG program stream, MPEG transport stream, Ogg, QuickTime, and Real Networks.

Some aspects of the method further include encoding the container as an International Organization for Standardization Base Media File Format (ISO-BMFF) container. In some of these aspects, the method also includes encoding a first indication of the first accessor data and a second indication of the first content in a first trak box of the container; and encoding a third indication of a second content and a fourth indication of second accessor data in a second trak box of the container. In some of these aspects, the method also includes encoding a first iloc box of the ISO-BMFF container to identify the first accessor data. Some aspects also include encoding a second iloc box of the ISO-BMFF container to identify the second accessor data.

Another aspect disclosed is a method of decoding a container. The method includes identifying first content in the container, identifying first accessor data in the container, first accessor data implementing a first platform independent algorithm for accessing the first content, and invoking the first algorithm on the first content. In some aspects, the method includes identifying a checksum for first accessor data in the container, and verifying first accessor data based on the checksum. In some aspects, the method also includes identifying an accessor version of the first accessor, and comparing the accessor version to a supported version, wherein invoking the first algorithm is conditioned on the accessor version being less than or equal to the supported version. Some aspects of the method also include identifying a content version of the first content, determining whether an installed accessor for the content version is available, invoking the installed accessor if it is available, and invoking the first accessor if an installed accessor is not available. Some aspects of the method also include identifying second accessor data in the container that implements a second platform independent algorithm for accessing the first content, invoking the second algorithm based on the identified second accessor data, wherein the second algorithm is invoked on the first content. In some aspects of the method, the first content is in a container format and the first algorithm extracts data from the first content. In some aspects of the method, the container format is one of ISO_BMFF, MP4, Advanced Systems Format, DivX Media Format, EVO, Flash Video, 3GP, 3G2, AVI, MPEG Video File, MPEG program stream, MPEG transport stream, Ogg, QuickTime, Real Networks.

In some aspects, the method also includes identifying second content in the container, identifying second accessor data in the container that implements a second algorithm for accessing second content; and invoking the second algorithm on the identified second content. In some aspects of the method, the method also includes annotating first content based on the invoking of the second algorithm.

Some aspects of the method include decoding the container as an International Organization for Standardization Base Media File Format (ISO-BMFF) container. Some of these aspects further include identifying a first trak box in the container, identifying first accessor data and first content based on the first trak box, and identifying a second trak box based on the first trak box, and identifying second content and second accessor data based on the second trak box. In some aspects, the method also includes identifying an iloc box in the ISO-BMFF container, and identifying the first accessor based on the iloc box. In some aspects, the method also includes identifying the iloc box based on an item identifier within a mdia box. In some aspects, the method also includes identifying the item identifier based on a bvri box within the mdia box.

Another aspect disclosed is an apparatus for encoding a multimedia data container. The apparatus includes a processor configured to encode first content in the container, encode first accessor data in the container, the first accessor data implementing a platform independent first algorithm for accessing first content, and write the container to a device. In some aspects, the processor is further configured to encode second accessor data in the container, second accessor data implementing a platform independent second algorithm for accessing first content.

Another aspect disclosed is an apparatus for decoding a container. The apparatus includes a processor, configured to identify first content in the container, identifying first accessor data in the container, first accessor data implementing a first platform independent algorithm for accessing the first content, and invoking the first algorithm on the first content.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
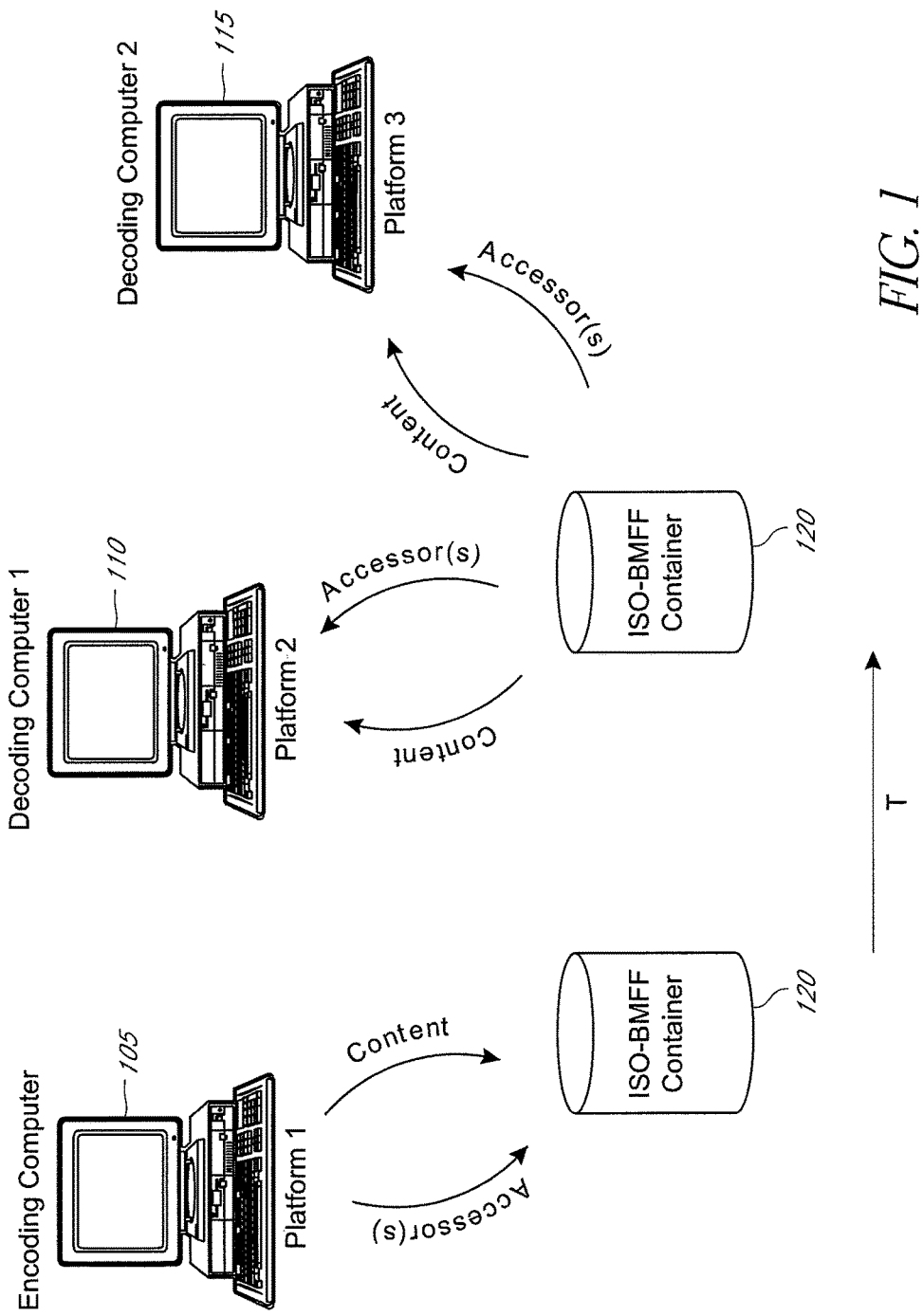
FIG. 1 is an overview diagram of a system for long term archival of electronic content.

The following detailed description is directed to certain specific embodiments. However, the teachings herein can be applied in a multitude of different ways, including for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, a system or apparatus may be implemented or a method may be practiced using any number of the aspects set forth herein. In addition, such a system or apparatus may be implemented or such a method may be practiced using other structure, functionality, or structure and functionality in addition to or other than one or more of the aspects set forth herein. In this description, reference is made to the drawings wherein like parts are designated with like numerals throughout.

Various embodiments of systems and methods are described herein for encoding and decoding/interpreting digital data and/or functionality. In the embodiments described herein, the systems and methods may allow digital data to be encoded and decoded/interpreted in a more efficient manner. For example, the systems and methods described herein may allow for configuration of an accessor to support decoding/interpretation of additional data formats. Further, the systems and methods may allow for any type of configuration, without requiring replacement of the decoder/interpreter hardware or download of new configuration data from an alternate data source other than the data provided with the digital multimedia.

Despite the work described above, there remains a need for a flexible container structure that permits multiplexing of the accessor functionality along with additional overhead information in a manner such that current multimedia decoders can access the digital data. In the case when the digital data are images, video, or audio, current multimedia decoders could retrieve and playback the digital data without utilizing the packaged accessor functionality.

The international standards organizations ISO and IEC developed a container format for storing audio, images, and video: ISO/IEC 14496-12 Information technology—Coding of Audio-Visual Objects—Part 12:ISO base media file format and ISO/IEC 14496-14 Information technology—Coding of Audio-Visual Objects—Part 14:MP4 file format. "The ISO Base Media File Format is designed to contain timed media information for a presentation in a flexible, extensible format that facilitates interchange, management, editing, and presentation of the media." ISO/IEC 14496-12 Information technology—Coding of Audio-Visual Objects—Part 12:ISO base media file format, pg. xii. A container is a metafile format whose specification describes how different data elements and metadata coexist in a computer file. Among them, the ISO base media file format (BMFF) is designed as a flexible extensible format that facilitates interchange, management, editing and presentation of the media and serves as the basis of other media file formats such as MP4 and 3GP. It is organized to store any kind of digital media, primarily video and audio, through a set of tracks. The container standard specifies a set of nested boxes that are permitted to contain designated pieces of audio, video, image, or header information. The standard permits, but discourages, new boxes. ISO/IEC 14496-12 Information technology—Coding of Audio-Visual Objects—Part 12:ISO base media file format, pg. 137.

The ISO-BMFF standard is the basis of mp1, mp2, mp3, mp4, 3gpp, F4V and many more data formats. Each of these standards defines some extensions to the base format. For example, the MP4 file format (ISO/IEC 14496-14) defines some extensions over ISO Base Media File Format to support MPEG-4 visual/audio codecs and various MPEG-4 system features such as object descriptors, scene descriptions and ES descriptors. However, the MP4 format still focuses on tracks and header objects for audio and video data. In addition, the RVC extensions only work for "VisualSample Entry" (Video, Image) data, but do not provide solutions for audio, presentation, or document oriented data.

The MP4 container facilitates streaming of data over networks. When streaming data in a traditional application, a traditional player would first read a moov box to identify compressed data locations in an mdat box. This enables seamless, time-sensitive streaming of the data. The moov and mdat boxes may be placed in an arbitrary order within the container. However, when the player/accessor is included in the MP4 container, as disclosed below, arbitrary ordering may not be sufficient to guarantee time-sensitive playback or display of the data.

Thus, there is a need to add objects to the standardized format to include one or more platform-independent accessors for digital data while maintaining accessibility by current players when the packaged digital data are audio, image, and/or video data. More specifically, it is important to provide for a file reader, conformant to the MP4 specification, to ignore multiplexed accessor and overhead information and simply utilize any packaged audio, image, and/or video digital data. In the MP4 format, a box is comprised, in part, of a type identifier and a length indicator. If the MP4 format is extended to new boxes, a current MP4 reader can still access known boxes, but can detect unknown boxes by checking the type identifier and ignoring the box by checking the length indicator. Thus, by extending the standardized format, any new information, such as a platform-independent accessor and/or overhead, packaged in a box with a new type indicator, is transparently handled by any existing MP4 file reader which just ignores the new information.

Further, there is a need to accommodate header information such as versioning information, security information, and additional user-supplied metadata in a container. Further, there is a need to provide for time-sensitive streaming of the encoded digital data and the one or more accessors and optional additional information. The disclosed methods and systems address the above needs at least in part by storing platform independent accessors along with the content in the container. This facilitates improved long term storage and archival of content. For example, in many cases, the ability to preserve content may far exceed an ability to provide accessors for that content. As a simple example, an 8-track tape may be easier to obtain than a working 8-track tape player. As another example, content created at the time of filing this application, such as .mp3 files, jpeg files, etc may be relatively easy to find fifty or one hundred years from now. However, readers or accessors of those formats may not be as readily available. By storing the accessor for content along with the content itself, an ability to access archived content over extended time periods may be enhanced.

FIG. 1 is an overview diagram of a system for long term archival of electronic content. The overview shows an encoding computer 105 and two decoding computers 110 and 115. The encoding computer 105 and/or decoding computers 110 and 115 may be any digital device with at least an electronic processor.

The encoding computer encodes a container and stores the encoded container in a data store 120. The encoding computer stores both content and accessor data for that content within the container. The accessor data implement platform independent algorithm(s) for accessing the content. For example, if the content is an audio/video file, the accessor data may define an accessor that is a player for the audio/video file. If the content is a word processing file, the accessor may be at least a basic word processing program that can read and interpret the word processing file and possibly prepare it for display. In some cases, the encoding computer 105 may store multiple accessors for the same content in the container.

For example, in one aspect the presentation data or content stored to the container may be scientific data. Two engineers may each develop separate programs to operate on the scientific data. Using the disclosed methods and systems, the scientific data may be packaged as presentation data or content in the container. Each of the programs developed by the two engineers may also be packaged as separate platform independent accessors for the content. In some aspects, two or more separate sets of content may be packaged in the container by the encoding computer. Each of these two separate sets of content may have their own accessor(s), also packaged within the same container. In some aspects, for example as shown, the container may be an ISO-BMFF container that includes extensions proposed herein.

After substantial time "T" passes, one or both of the decoding computers 110 and 115 may each read and decode the container. "T" may be an amount of time that traditionally presents challenges in preserving and/or maintaining an ability to access archived data. For example, "T" may be 50 or 100 years in some aspects. The decoding computers 110 and 115 may extract the one or more content and their associated accessor(s) from the container. The accessors may then be invoked using an accessor execution engine installed, in some aspects, on each of the decoding computers. For example, the accessor execution engine installed on the decoding computers may be a virtual machines such as a Java virtual machine (e.g. the accessor data is Java byte codes), common language runtime (e.g. the accessor data is common intermediate language (CIL), or other intermediate language interpreter. In some aspects, the accessor execution engine may implement a "just-in-time" or "ahead-of-time" compiler of programming language statements defined by the accessor data. In some aspects, the accessor execution engine may be an ANSI "C" compiler, with the accessor data defining "C" language source code.

In some other aspects, the accessor execution engine installed on the decoding computers may be a source code level interpreter, such as a basic interpreter (e.g. the accessor data defines basic language source code), perl interpreter (e.g. the accessor data defines perl source code), or python interpreter (e.g. the accessor data defines python source code). In yet other aspects, the accessor execution engine may be a hardware configuration engine, such as for FPGAs. When invoking the accessors decoded from the container, the decoding computers 110 and 115 may pass the content to the accessors as an input parameter, such that the accessors can process the content.

Figure 2:
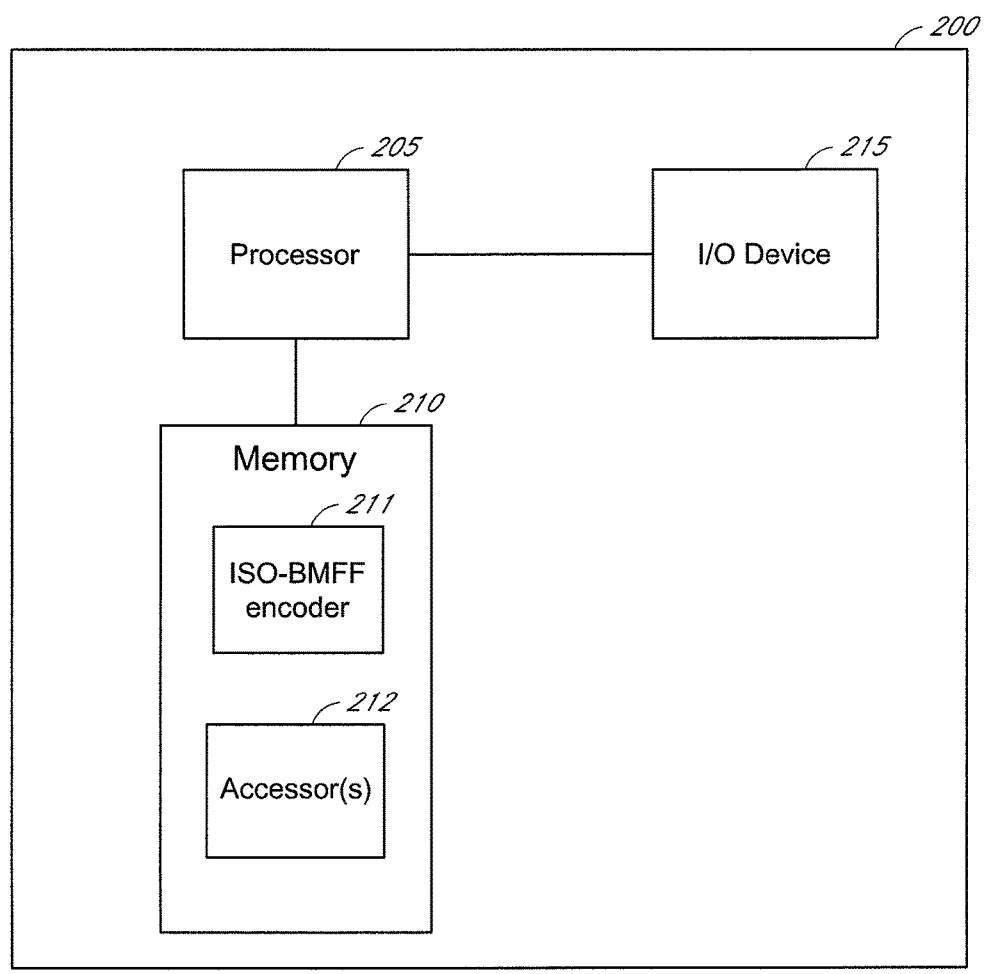
FIG. 2 is a structural block diagram of an apparatus capable of performing any of the encoding methods disclosed herein.

FIG. 2 is a structural block diagram of an encoding apparatus capable of performing any of the encoding methods disclosed herein. In some aspects, the encoding apparatus 200 may be equivalent to the encoding computer 105 shown in FIG. 1. The encoding apparatus 200 includes a processor 205, a memory 210, and an I/O device 215. The processor 205 may include one or more processors, or may be a processing system. The processor 205 is operably coupled to the memory 210, such that it can read and store data to the memory. The memory 210 stores instructions that configure the processor 205 to perform any of the encoding methods disclosed herein. The memory 210 is shown including instructions organized into at least two modules, an encoder module 211 (illustrated in FIG. 2 as an ISO-BMFF encoder module) and one or more accessors 212. The encoder module 211 configures the processor 205 to encode a container. For example, the encoder module 211 may configure the processor 205 to encode any of the ISO-BMFF formats disclosed below in FIGS. 4-10. In some aspects, the encoder module 211 may operate in substantial accordance with process 1100, described below with respect to FIG. 11. The encoder module 211 may be configured to include one or more of the accessors 212 in the ISO-BMFF container. The accessors 212 may implement one or more platform independent algorithms for accessing content encoded by the encoder 200.

In some aspects, when accessors 212 are platform independent, they may still include platform specific optimizations. For example, an accessor may include conditional logic that determines, in a platform independent manner, what type of platform the accessor is running on. Based on the platform type, some platform specific functions may be performed by the accessor. This may be done, in some aspects, to optimize accessor functions and/or performance on those platforms. For example, a platform specific API may be invoked by an accessor if the accessor determines it is running on a platform that supports the platform specific API. Note however, that although the accessors 212 may include platform specific features, platform independent accessors are still capable of platform independent execution, via the accessor execution engine 261 discussed below with respect to FIG. 3. Platform specific code will be executed by the accessor (via the accessor execution engine) after a determination is made that the platform on which the accessor is running can support the platform specific function.

The encoder module 211 may also configure the processor 205 to write the encoded container to the I/O device 215. The I/O device 215 may be a stable storage, such as a hard drive or static memory drive. The I/O device 215 may also be a network interface in some aspects. In some aspects described below, the processor 205 is configured to encode an ISO-BMFF container, and write the container to the I/O device 215.

Figure 3:
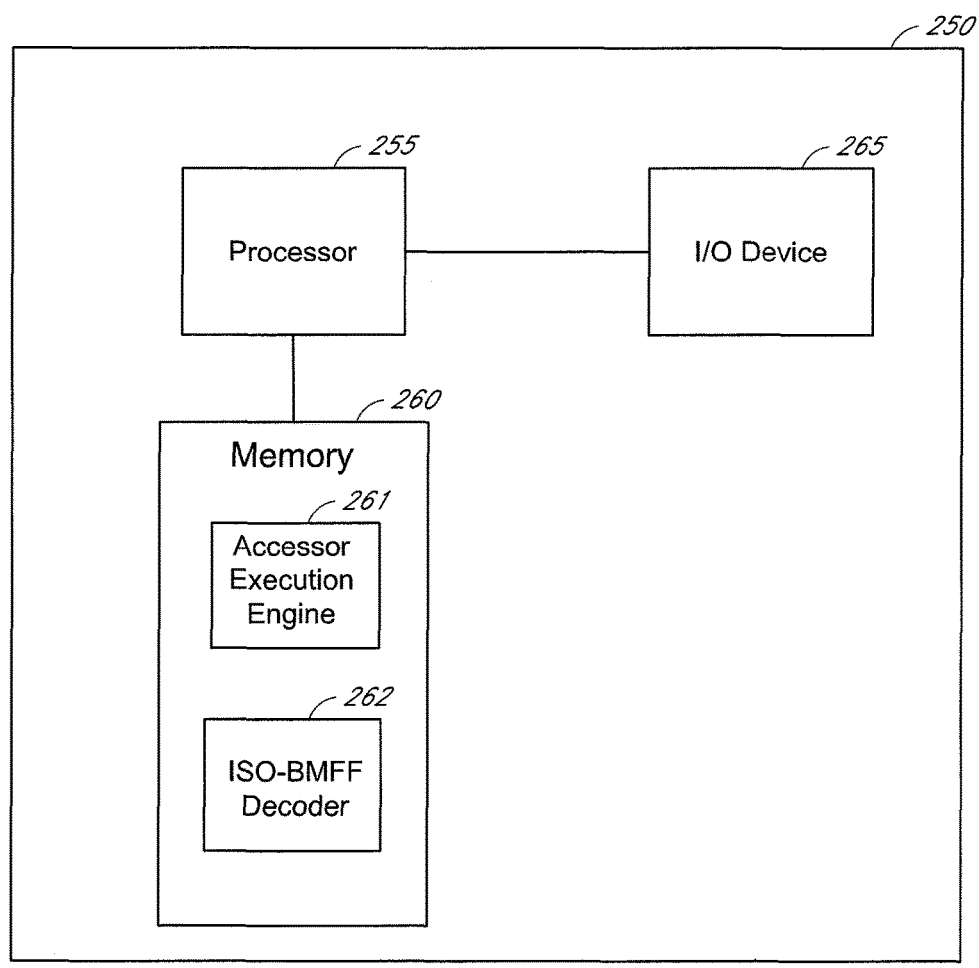
FIG. 3 is a structural block diagram of a decoding apparatus capable of performing any of the decoding methods disclosed herein.

FIG. 3 is a structural block diagram of a decoding apparatus 250 capable of performing any of the decoding methods disclosed herein. In some aspects, the decoding apparatus 250 may be equivalent to the decoding computers 110 and/or 115 shown in FIG. 1. The decoding apparatus 250 includes a processor 255, a memory 260, and an I/O device 265. The processor 255 may include one or more processors, or may be a processing system. The processor 255 is operably coupled to the memory 260, such that it can read and store data to the memory. The memory 260 stores instructions that configure the processor 255 to perform any of the methods disclosed herein. The memory 260 is shown including instructions organized into at least two modules, an accessor execution engine 261 and a decoder 262. The decoder module 262 configures the processor 255 to read a container from the I/O device 265. In some aspects, the container read from the I/O device is a ISO-BMFF container that includes extensions proposed herein (as shown). The decoder module 262 then configures the processor to decode the container. For example, the decoder module 262 may configure the processor 255 to decode any of the ISO-BMFF formats disclosed below in FIGS. 4-10. The decoder module 262 may configure the processor 255 to perform process 1200, described below with respect to FIG. 12.

During decoding of a container, the decoder 262 may identify one or more accessors included in the container. The decoder 262 is configured to invoke the one or more accessors by using the accessor execution engine 261. In some aspects, the accessor execution engine 261 is an intermediate language interpreter. For example, the accessor execution engine 261 may be a Java virtual machine or a common language runtime (CLR). In some other aspects, the accessor execution engine 261 may be a source language interpreter, such as a Basic language interpreter, perl interpreter, or a python interpreter. In some other aspects, the accessor execution engine 261 may be a compiler. In some aspects, the accessor execution engine 261 may compile and then assemble and link source code defined by accessor data included in the container. In some other aspects, the accessor execution engine 261 may configure hardware.

The I/O device 265 may be a stable storage, such as a hard drive or static memory drive. The I/O device 265 may also be a network interface in some aspects. In some aspects described below, the processor is configured to read a container from the I/O device 265 and decode the container.

Figure 4:
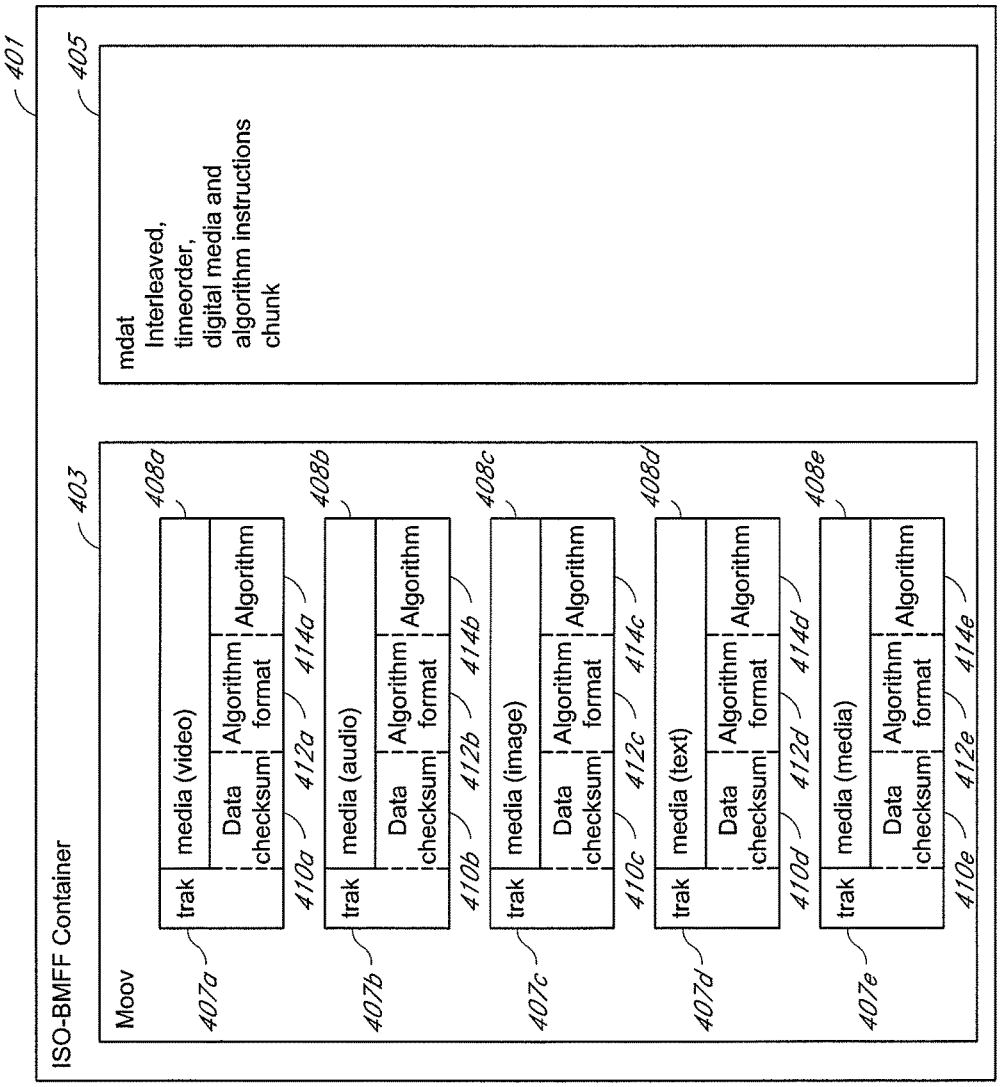
FIG. 4 is an illustration of an ISO-BMFF format container.

FIG. 4 is a high level illustration of a proposed ISO-BMFF container 401. The general concepts illustrated by FIG. 4 may be selectively applied in any of the example container formats shown below in FIGS. 5-10. The boxes in FIG. 4 show that additional non-traditional track "trak" boxes may be added to the container 401 to support digital data types such as, but not limited to, text, rich text documents, presentations, and scientific data. This extends the ISO-BMFF format by providing for the embedding of multiple types of digital data in a container. That is, a container may consist of one or more of the illustrated track boxes.

The container 401 includes a movie ("moov") box 403 and a media data ("mdat") box 405. Generally, the ISO-BMFF specification defines a moov box as a container box whose sub-boxes define metadata for a presentation. The mdat box 405 is defined by the ISO-BMFF specification as a box that can hold actual media data for a presentation. The illustrated aspect of FIG. 4 includes a moov box 403 that includes five trak boxes 407a-e. The number of trak boxes within the moov box may vary in other embodiments. Each track box includes an mdia box 408a-e. The ISO-BMFF standard traditionally defines a trak box to include a sequence of related samples for media data. Each mdia box 408a-e is defined by the ISO-BMFF specification to contain media information for a track. Some of the methods and systems disclosed herein propose to add additional data to each of the track boxes 407a-e. In some aspects, the proposed additional data may be included in only a subset of trak boxes included in the moov box 403.

The new data included in each of the trak boxes 407a-e includes checksum fields 410a-e, algorithm format fields 412a-e, and algorithm data indicator fields 414a-e. The checksum fields 410a-e may store hashes or checksums for algorithm defining data stored in the respective algorithm fields 414a-e. In some aspects, the hash or checksum fields 410a-e may indicate checksum values for both the algorithm data indicated by the respective algorithm field and also for content/presentation data for the associated trak, where the content and accessor algorithm are stored in the mdat box 405.

The algorithm format fields 412a-e may indicate a minimum version of an algorithm execution engine, such as a java virtual machine for Java based algorithms, common language runtime for C# algorithms, or other run-time interpreter, that is necessary to execute the algorithm indicated in the algorithm fields 414a-e. In some aspects, the algorithm format fields 412a-e may also indicate other dependencies associated with algorithms stored in the algorithm fields 414a-e. For example, input or output formats (such as RGB, YUV, etc), input/output functions of the algorithms stored in algorithm fields 414a-e, and/or data indicating possible optimizations and/or alternative functionality of the algorithms indicated in algorithm fields 414a-e may also be specified in the algorithm format fields 412a-e. For example, an accessor may define several methods for functions. Some of those functions may include platform specific functionality for decoding. In some aspects, the algorithm format fields 412a-e may store details of the data format being accessed.

In some aspects, the algorithm fields 414a-e indicate data implementing an algorithm. In some other aspects, the algorithm fields 414a-e identify a portion of the mdat box 405 that stores data implementing the algorithm. For example, the algorithm fields 414a-e may indicate a starting location of data implementing an algorithm based on an offset from the beginning of the container 401. A length of respective algorithm implementing data stored in the mdat box 405 may also be indicated by the algorithm fields 414a-e.

Note that in some aspects, existing ISO-BMFF boxes, such as the xml box or the udat box, may contain or point to header, provider-supplied metadata, and accessor information. This option may override other required information in the container. This may not promote reusability of information between track boxes. Each track box may contain header information such as one or more checksums, e.g., MD5 or SHA, versioning information, and the index to the intermediate-format accessor algorithms.

Figure 5:
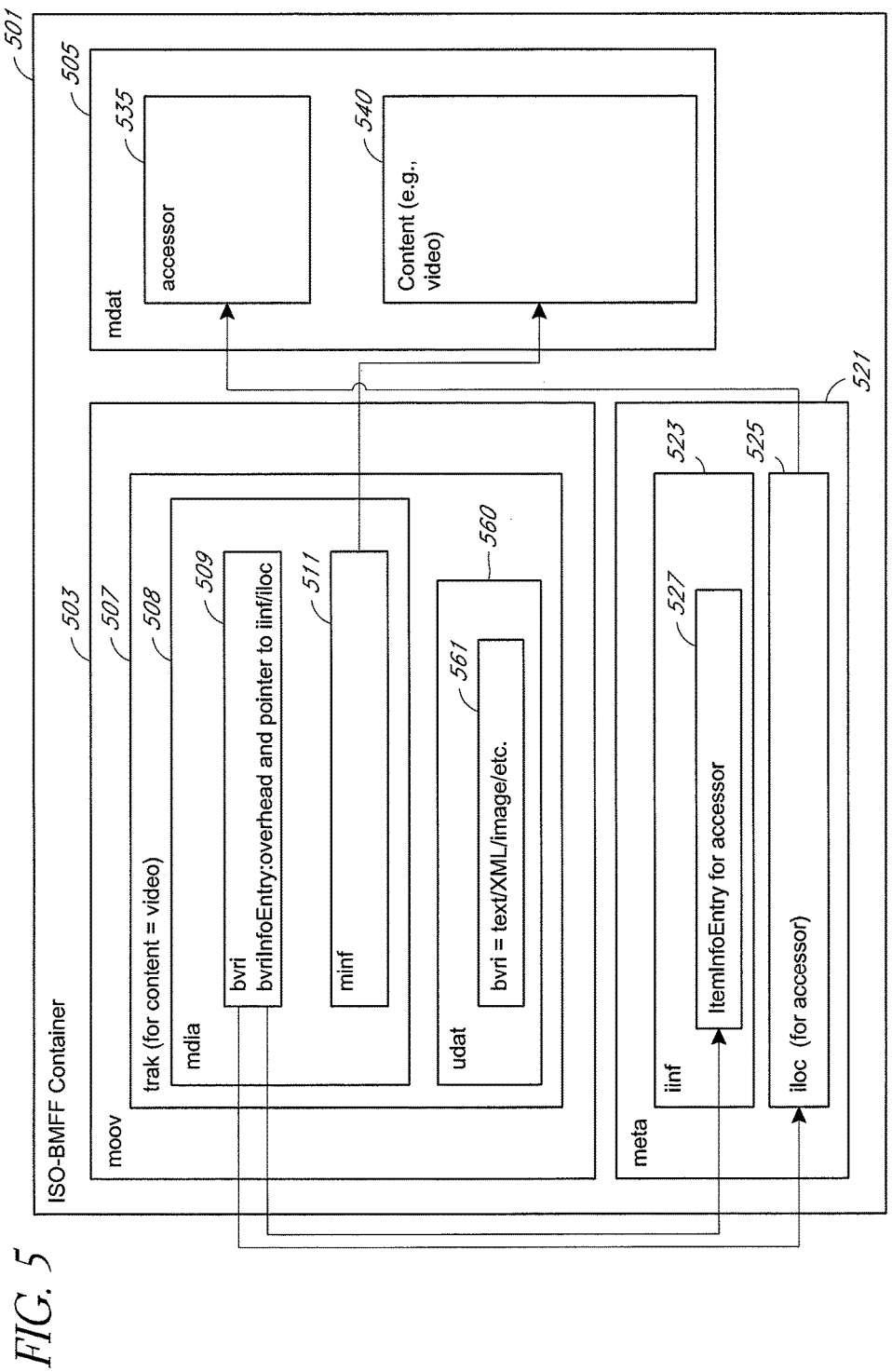
FIG. 5 shows an example implementation of an ISO-BMFF container that includes one or more accessors for data contained within the ISO-BMFF container.

FIG. 5 shows an example implementation of an ISO-BMFF container. The container 501 includes one or more accessors for data contained within the container. As illustrated in the high level overview provided by FIG. 4, the ISO-BMFF container 501 includes a movie (moov) box 503 and a media data (mdat) box 505. The moov box 503 includes at least one trak box 507. The trak box 507 includes a mdia box 508. The mdia box includes a new box, provisionally called a Bevara Resource Indication box or "bvri" box 509. The bvri box 509 may be assigned any unique box identifier not already assigned to a known box type. The bvri box 509 includes an info entry that identifies an iteminfoentry 527 within an iinf box 523. The bvri box 509 also identifies (via the info entry) an iloc box 525 within a meta box 521 (discussed below).

The mdia box 508 also includes a media information container or minf box 511. The minf box includes information identifying a location of content 540 in the mdat box 505. For example, the minf box 511 may indicate an offset from the beginning of the container 501 where the content 540 begins, and a length of the content in the mdat box 505. The content 540 may include any type of content. For example, the content 540 may comprise audio and/or video data. In some aspects, the content 540 may include other types of content not traditionally included in an ISO-BMFF container, such as word processing data encoding a document (such as .doc, .docx, .pdf, .rtf files). In some aspects, the content 540 may encapsulate or include other container formats. For example, content 540 may define an ogg container, avi container, f4v or FLV (Flash® video), DivX® media format, any of the Microsoft® Office® document formats, etc.

The container 501 also includes a meta box 521. The meta box 521 includes the iinf box 523 and the iloc box 525. The iinf box 523 includes the item info entry 527. The item info entry 527 includes information about an accessor 535 for the content 540. For example, the item info entry 527 may include a hash of the content 540, such as a checksum, or other information about content 540.

In some aspects, the content 540 may include uncontained data. In these aspects, the accessor 535 may implement a decoder/interpreter for the uncontained data. For example, if content 540 contains document data, accessor 535 may implement a word processor for the document data. If the content 540 is video data, the accessor 535 may implement a video decoder for the video data.

As discussed above, in some other aspects, the content 540 may include data formatted in one or more container formats. In these aspects, the accessor 535 may implement an algorithm that can both extract data from the container format, and then also access or decode the data encapsulated or "contained" by that container. For example, if the content 540 contains ogg container data that encapsulates avi data, the accessor 535 may implement both an ogg extractor and an avi decoding algorithm.

Figure 9:
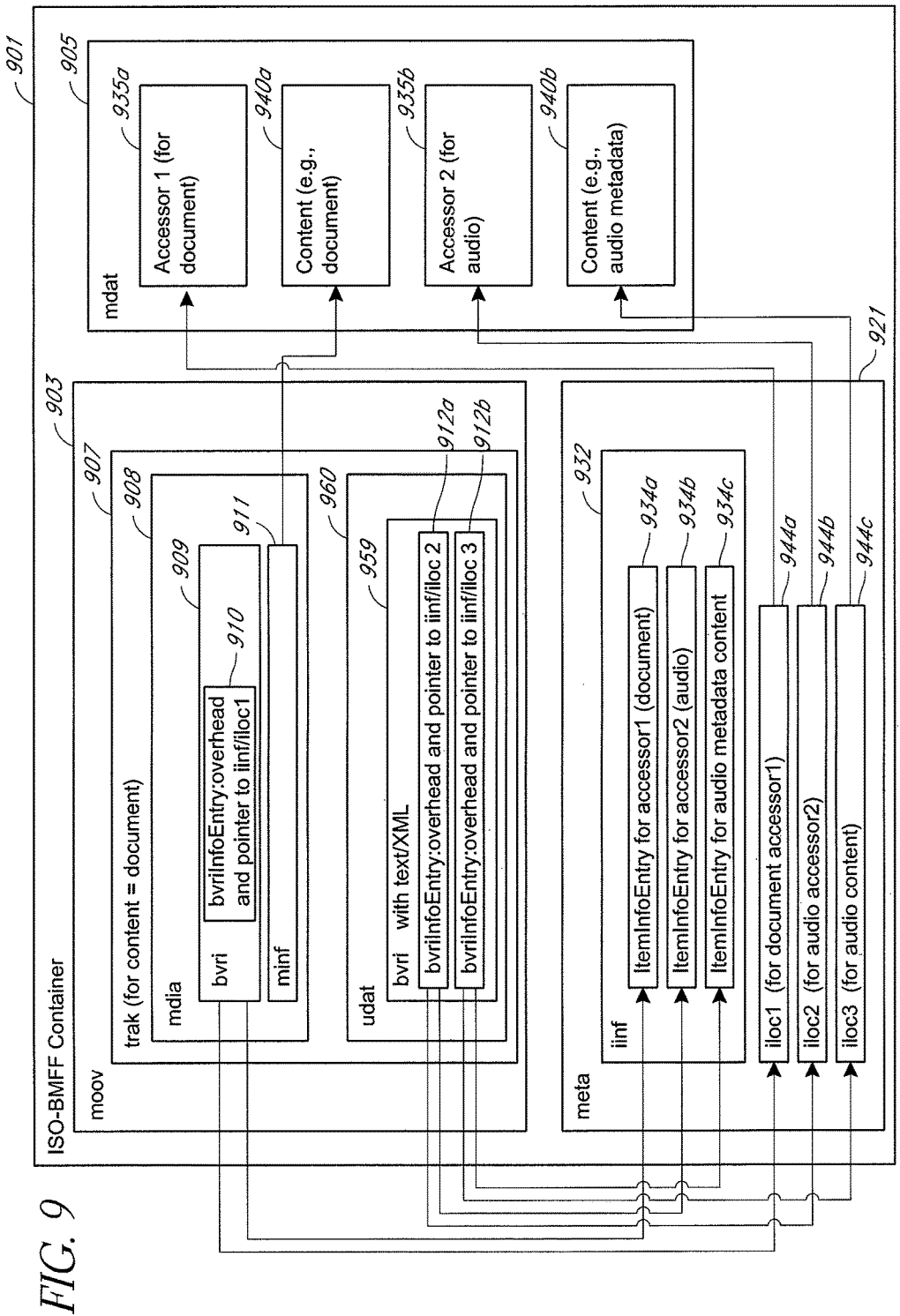
FIG. 9 shows another example of a proposed ISO-BMFF container format.
Figure 10:
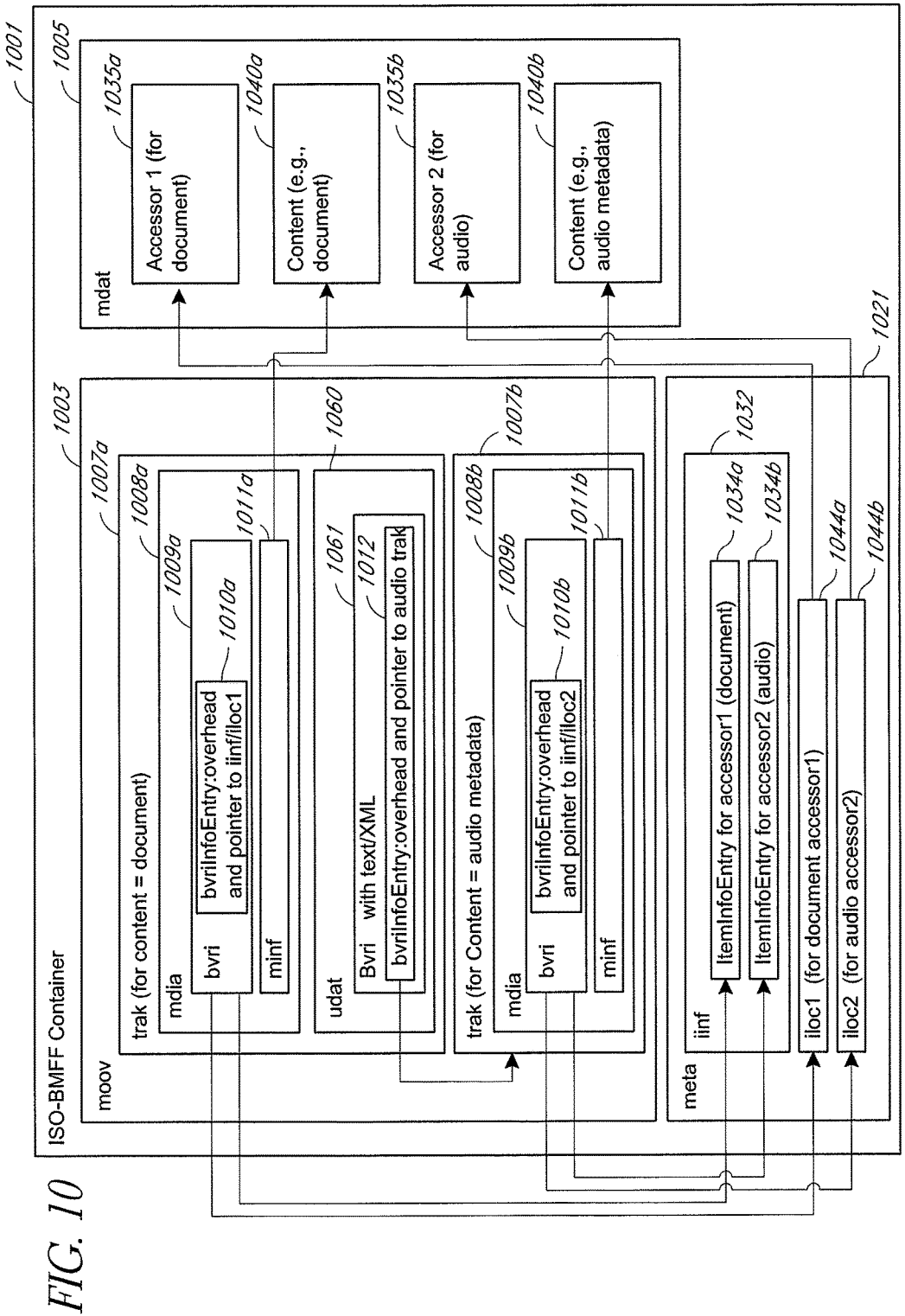
FIG. 10 shows another example of a proposed ISO-BMFF container format.

The udat box 560 illustrates that some aspects of an enhanced container may include metadata 561 associated with content identified by the minf box 511 in the media box 508 (or in the case of content 640 below, content identified indirectly by box 610a, via an index and the actual location information in box 644b). In some aspects, the metadata 561 may be supplied by a user. The metadata 561 may be in the form of text, XML, or other typed data. Alternatively, or in addition, as shown in FIGS. 9 and 10 below, metadata may itself have associated accessors.

The disclosed methods and systems may encode typed metadata (and XML which is really formatted text) by either including it in a udat bvri box, such as udat bvri box 561, or by pointing to it when the metadata is contained in the mdat box 505. When content or meta-data has an associated accessor, an additional bvriInfoEntry may be provided in the udat box as illustrated in FIG. 10 below The format disclosed in FIG. 5 embeds a platform independent accessor in a container and also embeds the content to be accessed. The format may optionally embed metadata related to the content. If the content is multimedia content such as video, a traditional video player able to interpret MP4 containers may then parse the extended ISO-BMFF container shown in FIG. 5, and may ignore boxes 509, 527, 525, 535, and 561. This traditional video player will use its own built-in video decoder to decode the content in box 540. Thus, the format shown in FIG. 5 is backwards compatible to existing players when the content in box 540 conforms with the ISO-BMFF specification at the time of filing the present application (for example, audio content, image content, video content).

Figure 6:
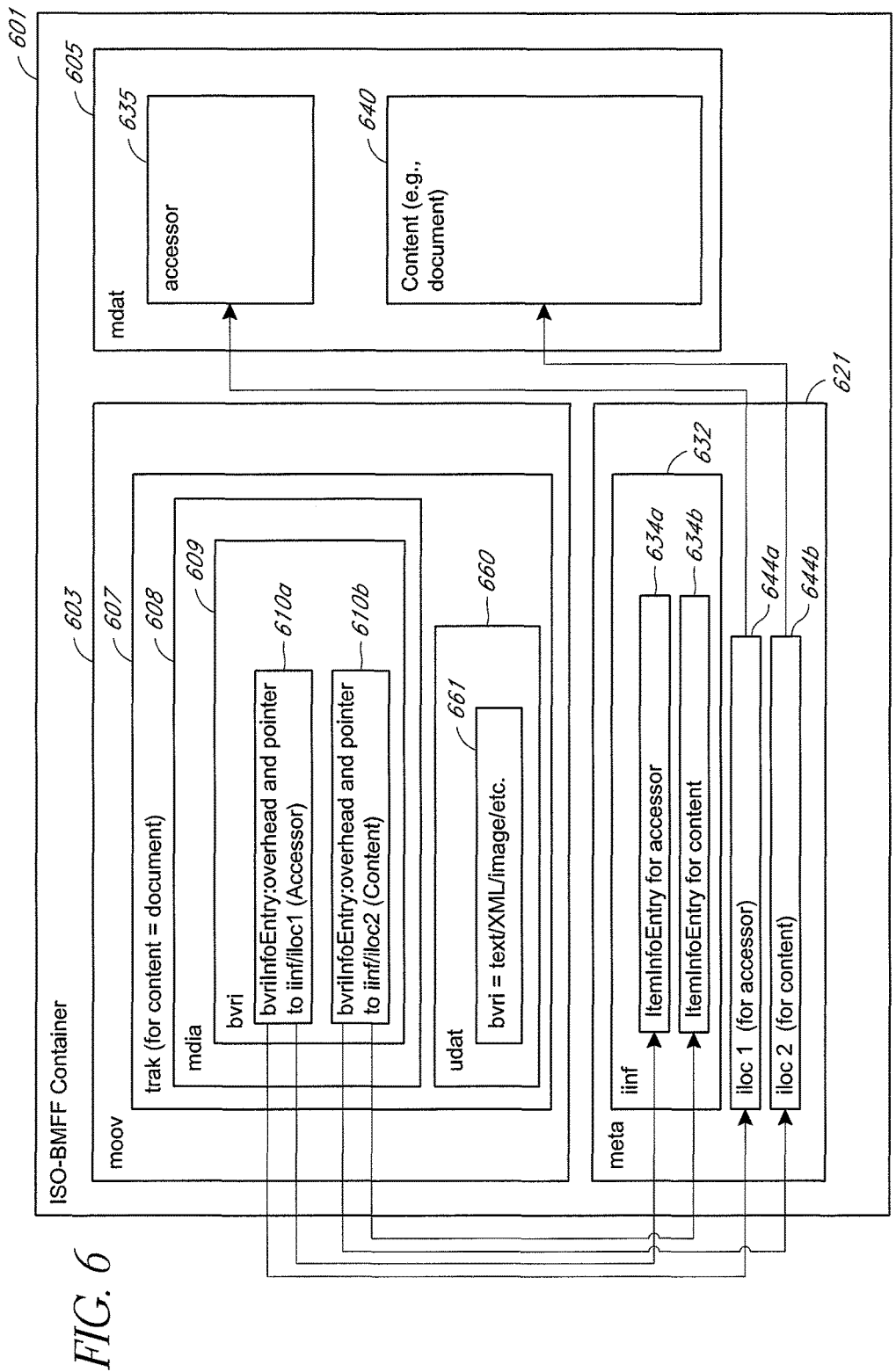
FIG. 6 shows another example of a proposed ISO-BMFF container format.

FIG. 6 shows another example of a proposed ISO-BMFF container format 601. Similar to FIGS. 4 and 5, the ISO-BMFF container 601 includes a movie (moov) box 603 and a media data (mdat) box 605. The moov box 603 includes at least one trak box 607. The trak box 607 includes an mdia box 608. The mdia box includes a new "bvri" box 609, similar to bvri box 509 discussed above. The bvri box 609 may be assigned any unique box identifier not already assigned to a known box type.

The bvri box 609 includes two bvri info entries 610a and 610b. In some aspects, the two bvri info entries 610a-b may be an array of bvriInfoEntry boxes or an array of info inside one bvriInfoEntry. The first bvri info entry 610a identifies an item info entry 634a. The item info entry 634a is located within an iinf box 632. The iinf box 632 is located within a meta box 621. The item info entry 634a includes information relating to accessor data 635. For example, the item info entry 634a may include checksum information for the accessor data 635. In some aspects, the item info entry 634a may include version information for the accessor data 635. For example, the version information may indicate a minimum version of an accessor execution engine that can be used to invoke an algorithm implemented by the accessor data 635. Accessor data 635 implements one or more algorithms for accessing content 640.

The first bvri info entry 610a also identifies a iloc box 644a within the meta box 621. The iloc box 644a includes information identifying accessor data 635 within the mdat box 605. For example, the iloc box 644a may indicate a starting offset for accessor data 635 relative to the beginning of the container 601. This starting offset may fall within the mdat box 605. The iloc box 644*a* may also indicate a length of the accessor data 635 within the mdat box 605.

The second bvri info entry 610*b* identifies an item info entry 634*b* stored within the iinf box 632. The item info entry 634*b* includes information relating to content 640. The second bvri info entry 610*b* also identifies a second iloc box 644*b*. The second iloc box 644*b* identifies content 640 within mdat box 605. Similar to content 540 discussed with respect to FIG. 5, content 640 may contain media data, for example, video, audio, data encoding a document, data encoding a container, or other form of digital data.

Accessor 635 relates to or is associated with content 640 because it is referenced by the same trak 607 as content 640. A decoder of the container 601 may invoke accessor 635 on content 640 based on the accessor 635 and the content 640 being indicated by the same trak 607. In the disclosed embodiments, a container may be structured to relate one accessor with multiple content(s) by referencing the one accessor from multiple tracks (trak boxes).

The trak box 607 also includes a udat box 660, and a brvi entry 661. In the illustrated embodiment, the bvri entry 661 indicates metadata relating to the content stored in content box 640 and associated with the trak box 607. In the example of udat box 660, a type of the metadata 661 may be text, xml, image, or any type.

Similar to the container 501 of FIG. 5, the container format 601 disclosed in FIG. 6 also embeds a platform-independent accessor in a container with the content to be accessed. The container may also optionally embed metadata pertaining to content 640. Whereas FIG. 5 utilizes the minf box 511 to identify content 540, note that the embodiment of FIG. 6 utilized the iloc box 644*b* to identify content 640; see boxes 660 and 661 corresponding to boxes 560 and 561 of FIG. 5. Utilization of the minf box provides for fragmenting of content into samples or access units using stbl boxes as described by the ISO-BMFF specification. Each sample may have associated metadata (timing and content information).

Figure 7:
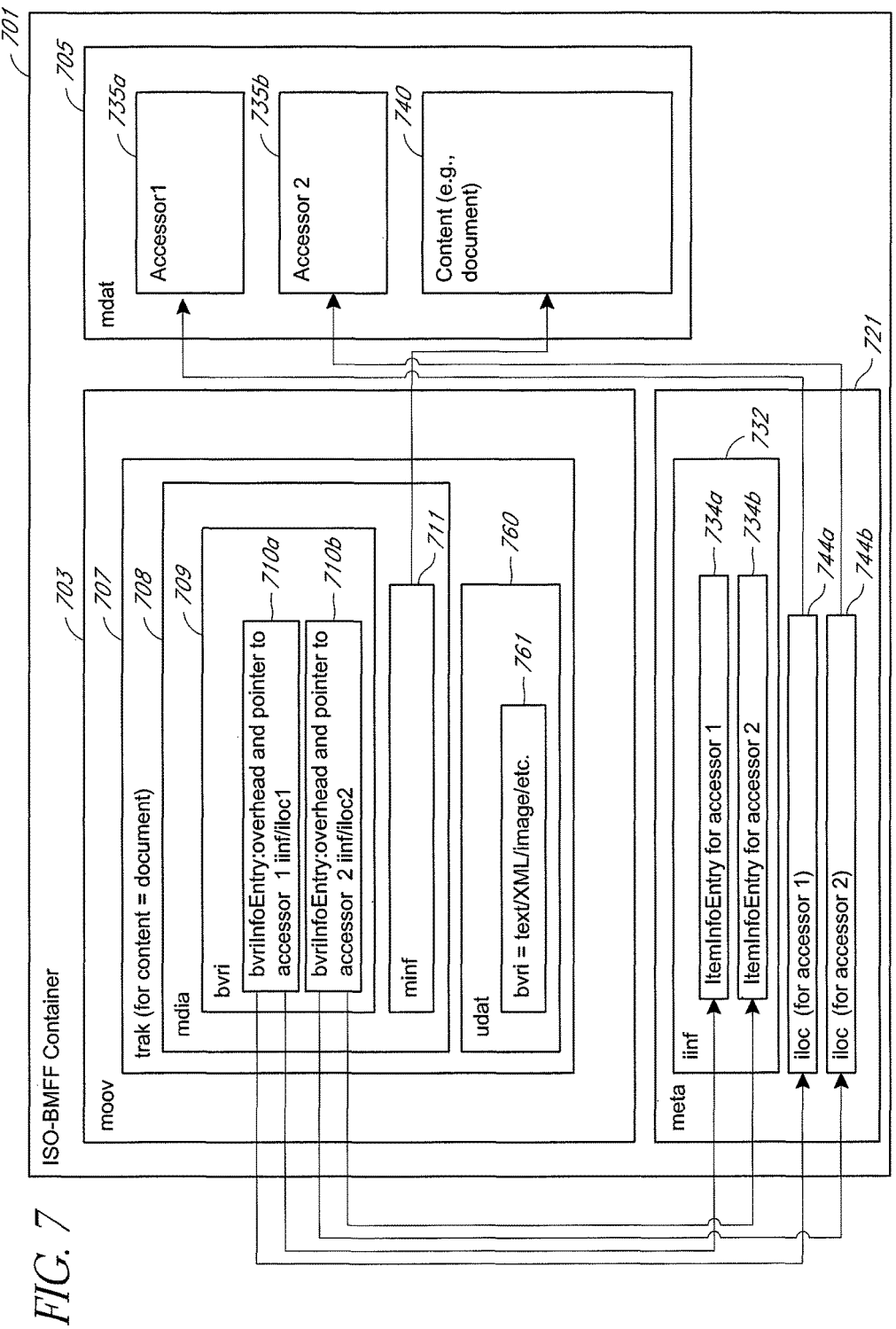
FIG. 7 shows another example of a proposed ISO-BMFF container format.

FIG. 7 shows another example of a proposed ISO-BMFF container format 701. Similar to FIGS. 4-6, the ISO-BMFF container 701 includes a movie (moov) box 703 and a media data (mdat) box 705. The moov box 703 includes at least one trak box 707. While the trak box 707 is shown as including document type content, it should be understood that the format of the container provided in FIG. 7 can support any content data type. The trak box 707 includes a mdia box 708. The mdia box includes a new "bvri" box 709, similar to bvri boxes 509, and/or 609 discussed above. The bvri box 709 may be assigned any unique box identifier not already assigned to a known box type. The bvri box 709 may include a first bvri info entry 710*a* that identifies an item info entry 734*a* within an iinf box 732 and an iloc box 744*a*, discussed below. The bvri box 709 may also include a second bvri info entry 710*b* that identifies a second item info entry 734*b* within the iinf box 732 and a second iloc box 744*b*.

The mdia box 708 also includes a media information container or minf box 711. The minf box 711 includes information identifying a location of content 740 in the mdat box 705. For example, the minf box 711 may indicate a starting position of the content 740 based on an offset from the beginning of the container 701. The minf box 711 may also indicate a length of the content 740 in the mdat box 705. The content 740 identified by the minf box 711 may be content corresponding to the track identified by the trak box 707. To retain compatibility with decoders that can access mp4 video, the embodiment of FIG. 7 utilizes standard video container structures. For example, in some aspects, content 740 may be video content, and is identified via the minf box 711. In some other aspects, content 740 may be document content, audio content, a container, image content, or virtually any other digital typed data.

The ISO-BMFF container 701 also includes a meta box 721. The meta box 721 includes the iinf box 732 and the iloc boxes 744*a* and 744*b*. The iinf box 732 includes an item info entry 734*a*. The item info entry 734*a* includes information relating to accessor 735*a* (optionally including version and/or hash/checksum information as discussed above). The iinf box 732 also includes a second item info entry 734*b* that includes information relating to accessor 735*b*.

The meta box 721 also includes an iloc box 744*a*. The iloc box 744*a* identifies data in the mdat box 705 implementing an accessor 735*a* for content 740. For example, the iloc box 744*a* may identify accessor 735*a* via an offset from the beginning of the container 701 and length within the mdat box 705. The meta box 721 also includes an iloc box 744*b*. The iloc box 744*b* identifies data in the mdat box 705 defining an accessor 735*b* for content 740. The embodiment of FIG. 7 shows that more than one accessor may be defined for the same content (content 740) when using various aspects of the proposed ISO-BMFF container formats.

The format disclosed in FIG. 7 permits more than one platform-independent accessor to be packaged with their associated content. The accessors 735*a*-*b* are related to the content 740 through the bvri box 709 within the trak 707. This structure provides a concise and consistent packaging of the content 740 and the accessors 735*a*-*b*. To process the container format illustrated in FIG. 7, a decoding device (for example, the decoding apparatus 250) determines by reading the trak 707 and identifying at least two bvrInfoEntries 710*a*-*b* and associated content 740, that more than one accessor is packaged with the trak 707. In some aspects, the decoder may provide a user with an option of which one of the accessors should be executed on the associated content/data. In other aspects, both accessors 735*a*-*b* may be invoked automatically on the content 740. The container may also optionally contain embedded metadata pertaining to content 740; see boxes 760 and 761 corresponding to boxes 560 and 561 of FIG. 5.

Figure 8:
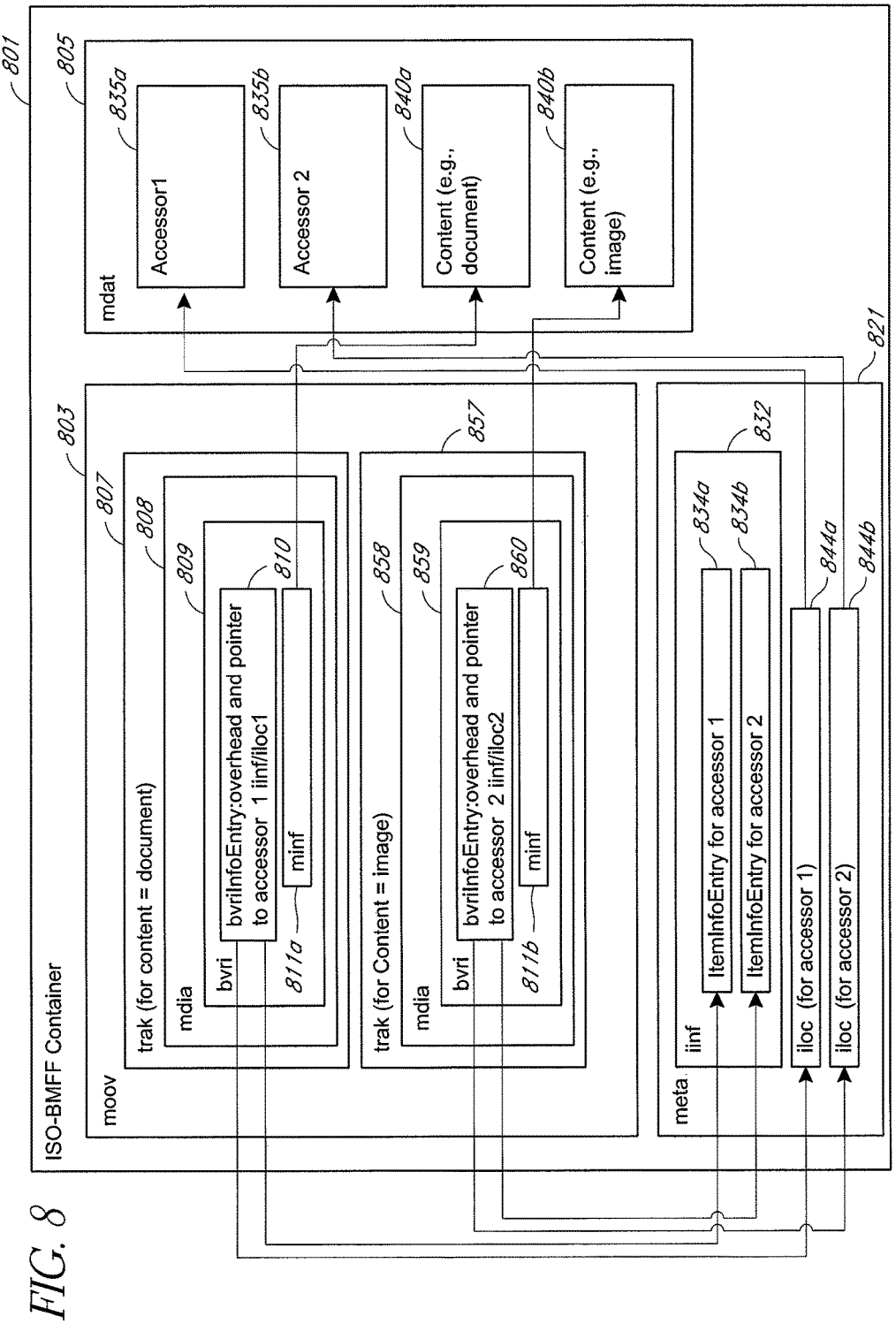
FIG. 8 shows another example of a proposed ISO-BMFF container format.

FIG. 8 shows another example of a proposed ISO-BMFF container format 801. Similar to FIGS. 4-7, the ISO-BMFF container 801 includes a movie (moov) box 803 and a media data (mdat) box 805. The moov box 803 includes at least one trak box 807. The trak box 807 includes a mdia box 808. The mdia box includes a new "bvri" box 809, similar to bvri boxes 509, 609, and/or 709 discussed above. The bvri box 809 may be assigned any unique box identifier not already assigned to a known box type. The bvri box 809 may include a bvri info entry 810 that identifies an item info entry 834*a* within iinf box 832 and an iloc box 844*a*, discussed below.

The mdia box 808 also includes a media information container or minf box 811*a*. The minf box 811*a* includes information that identifies content 840*a*. For example, the minf box 811*a* may indicate a starting position of content 840*a* based on an offset from the beginning of the container 801. The minf box 811*a* may also indicate a length of the content 840*a*.

The moov box 803 also includes a second trak box 857. The trak box 857 includes a second mdia box 858. The second mdia box 858 includes a new "bvri" box 859. The bvri box 859 may also be assigned any unique box identifier not already assigned to a known box type. The bvri box 859 has the same box identifier as bvri box 809. The bvri box 859 may include a bvri info entry 860 that identifies an item info entry 834*b* within the iinf box 832. The bvri info entry 860 within the bvri box 859 may also identify an iloc box 844*b*. The second bvri box 859 also includes a second minf box 811*b*.

The ISO-BMFF container 801 also includes a meta box 821. The meta box 821 includes the iinf box 832. The iinf box 832 includes the item info entry 834*a* and a second item info entry 834*b*. The item info entry 834*a* may include information relating to accessor 835*a* (such as hash and/or version information as discussed previously). The second item info entry 834*b* includes information relating to accessor 835*b*.

The meta box 821 also includes the iloc box 844*a*. The iloc box 844*a* identifies data in the mdat box 805 defining an accessor 835*a* for content 840*a*. For example, the iloc box 844*a* may identify an offset from the beginning of the container 801 and length within the mdat box 805. The meta box 821 also includes an iloc box 844*b*. The iloc box 844*b* identifies data in the mdat box 805 implementing an accessor 835*b* for content 840*b*. The embodiment of FIG. 8 shows that a single ISO-BMFF container may define multiple tracks, with each track identifying its own content and at least one accessor for that content. The accessor(s) 835*a* and 835*b* are specific to each track 807 and 857 respectively in FIG. 8. Note that while FIG. 8 does not show metadata associated with either content 840*a* or 840*b*, some aspects of the container 801 may also associate metadata with one or both of contents 840*a-b*. For example, the metadata structures shown in FIG. 9 and/or FIG. 10 may also be used with the container 801 in some aspects.

The format disclosed in FIG. 8 permits the packaging of more than one content (e.g. 840*a-b*) while also packaging platform-independent accessors 835*a-b* for each content 840*a-b*. Each accessor is related to its associated content through a bvri box within the trak. This provides a concise and consistent packaging of the multiple contents and their associated accessors.

To process the ISO-BMFF format illustrated in FIG. 8, an ISO-BMFF decoder 262 may read the moov box 803 and recognize that more than one trak, e.g. 807 and 857, are present. This indicates that more than one content is available and that more than one accessor is packaged. The decoding device, depending on configuration, may then either invoke both accessors so that they operate on their respective content. In some aspects, the decoding device may provide a user with an option to select which one of the accessors to invoke and use on its associated content/data.

In some aspects, the format of FIG. 8 may encode embedded video (embedded content) in a powerpoint presentation (wrapper content) or embedded data graphics (embedded content) in a scientific document (wrapper content). One aspect of a decoder of the format of FIG. 8 may enable a user to view/playback the presentation or document (wrapper content) via a corresponding second accessor until the embedding location is reached. When the playback reaches the location of the embedded content, the decoder may invoke a corresponding first accessor which operates on the embedded content. In some aspects, a pointer from the first content back to the secondary content trak in the ISO-BMFF container is provided (not shown). In some aspects, a pointer from the first track to the second trak may be provided, which provides an indication of where the embedded content and accessor for the embedded content is located.

FIG. 9 shows another example of a proposed ISO-BMFF container format 901. Similar to FIGS. 4-8, the ISO-BMFF container 901 includes a movie (moov) box 903 and a media data (mdat) box 905. The moov box 903 includes at least one trak box 907. The trak box 907 includes a mdia box 908. The mdia box 908 includes a new "bvri" box 909, similar to bvri boxes 509, 609, 709, and/or 809 discussed above. The bvri box 909 may be assigned any unique box identifier not already assigned to a known box type. The bvri box 909 may include a bvri info entry 910 that identifies an item info entry 934*a* within iinf box 932 and an iloc box 944*a*, discussed below.

The mdia box 908 also includes a media information container or minf box 911. The minf box includes information that identifies content 940*a*. In some aspects, content 940*a* may define a document, such as a word processing document (.doc, .txt, .rtf, etc), but may alternatively include any other type of content.

The trak box 907 also includes a user data or udat box 960. The udat box 960 includes a metadata bvri box 959 including two bvri info entries 912*a* and 912*b*. The bvri info entry 912*a* identifies an item info entry 934*b* within iinf box 932 and an iloc box 944*b*. The bvri info entry 912*b* identifies an item info entry 934*c* within iinf box 932 and an iloc box 944*c*.

The ISO-BMFF container 901 also includes a meta box 921. The meta box 921 includes the iinf box 932. The iinf box 932 includes an item info entry 934*a*, a second item info entry 934*b*, and a third item info entry 934*c*. The item info entry 934*a* includes information relating to accessor 935*a*. The iinf box 932 also includes a second item info entry 934*b* that includes information relating to accessor 935*b*. The iinf box 932 also includes a third item info entry 934*c* that includes information relating to metadata content 940*b*.

The meta box 921 also includes three iloc boxes 944*a-c*. The iloc box 944*a* identifies data in the mdat box 905 defining an accessor 935*a* for content 940*a*. For example, the iloc box 944*a* may identify an offset from the beginning of the container 901 identifying a starting position of accessor 935*a*, and a length within the mdat box 905 of accessor 935*a*. The meta box 921 also includes a iloc box 944*b*. The iloc box 944*b* identifies data in the mdat box 905 defining an accessor 935*b* for content 940*b*. The iloc box 944*c* identifies data in the mdat box 905 defining metadata content 940*b*, which may be audio metadata in some aspects, but may alternatively include any other type of content.

The embodiment of FIG. 9 shows that complex metadata (identified by the udat box 960) may include multiple formats of metadata for one content. Metadata may not be limited to text or xml data. For example, audio or graphics data may be used to annotate content. For example, content 940*b* may annotate content 940*a* in the example of FIG. 9. Because the metadata identified in the udat box 960 is within the trak box 907, the metadata is associated with content associated with track box 907 (i.e. content 940*a* via minf box 911).

The format disclosed in FIG. 9 provides for complex forms of metadata packaged and associated with particular content. This provides some degree of "future-proofing" of metadata, in a similar manner that the main content is future proofed, i.e., an expanded ISO-BMFF container contains information to interpret/decode both the packaged content and the packaged metadata When processing the proposed ISO-BMFF format illustrated in FIG. 9, a decoder 262 may reads the moov box 903 and recognize that the trak 907 "contains" (contains or points to) both content and metadata. By examining the udat metadata bvri box 959, the decoder can identify that some of the metadata is complex, that is, it also requires an accessor above and beyond the accessor required by the content 940a. The decoder, depending on configuration, may then either invokes both accessors such that they operate on their respective content simultaneously, or may provide a user with an option of displaying/playing the metadata in addition or, or instead of, the main content.

FIG. 10 shows another example of a proposed ISO-BMFF container format 1001. Similar to FIGS. 4-9, the ISO-BMFF container 1001 includes a movie (moov) box 1003 and a media data (mdat) box 1005. The moov box 1003 includes at least one trak box 1007a. The trak box 1007a includes an mdia box 1008a. The mdia box 1008a includes a new "bvri" box 1009a, similar to bvri boxes 509, 609, 709, 809, and/or 909 discussed above. The bvri box 1009a may be assigned any unique box identifier not already assigned to a known box type. The bvri box 1009a may include a bvri info entry that identifies an item info entry 1034a within iinf box 1032 and an iloc box 1044a, discussed below.

The mdia box 1008a also includes a media information container or minf box 1011a. The minf box 1011a includes information that identifies content 1040a. In some aspects, content 1040a may define a document, such as a word processing document. (.doc, .txt, .rtf, etc), or may define any other type of content, for example, spreadsheets, presentations, figures, video, image, and/or audio data.

The trak box 1007a also includes a user data or udat box 1060. The udat box 1060 includes a bvri box 1061 including a bvri info entry 1012. The bvri info entry 1012 identifies a second track box 1007b.

The second track box 1007b includes a second mdia box 1008b. The second mdia box 1008b includes a second bvri box 1009b. This second bvri box 1009b includes one or more item info entries 1010b that identify a second item info entry 1034b within iinf box 1032 and a second iloc box 1044b. The second mdia box 1008b also includes a second minf box 1011b which includes information identifying metadata content 1040b.

The ISO-BMFF container 1001 also includes a meta box 1021. The meta box 1021 includes the iinf box 1032. The iinf box 1032 includes an item info entry 1034a, and a second item info entry 1134b. The item info entry 1034a includes information relating to accessor 1035a (for example, versioning or hash information as discussed previously). The iinf box 1032 also includes a second item info entry 1034b that includes information relating to accessor 1035b.

The meta box 1021 also includes two iloc boxes 1044a-b. The iloc box 1044a identifies data in the mdat box 1005 defining an accessor 1035a for content 1040a. For example, the iloc box 1044a may identify an offset from a beginning of the container 1001 and length within the mdat box 1005 that includes data implementing an algorithm for accessing the content 1040a. The meta box 1021 also includes the iloc box 1044b. The iloc box 1044b identifies data in the mdat box 1005 defining an accessor 1035b for content 1040b. For example, the iloc box 1044b may identify a starting position for the accessor 1035b based on offset from a beginning of the container 1001. The iloc box 1044b may also indicate a length of accessor 1035b.

The embodiment of FIG. 10 shows that complex metadata may identify multiple formats of metadata for one content 1040a. Metadata may not be limited to text or xml data. In this example, metadata is shown to include an audio annotation (provided by accessor 1035b operating on content 1040b) in addition to or in place of text/XML metadata (provided by udat box 1060).

The advantages of the format disclosed in FIG. 10 are that complex forms of metadata can be packaged with the associated content. This provides some degree of future proofing of metadata in the same way that the main content is future proofed, i.e., that the expanded ISO-BMFF container holds all the information required to interpret/decode both the packaged content and the packaged metadata.

To process an ISO-BMFF format illustrated in FIG. 10, a decoder, such as decoding apparatus 250) may read the moov box 1003 and determine that the trak 1007a "contains" (contains or points to) both content and metadata. By examining the udat metadata bvri box, the decoder may determine that some of the metadata is complex, that is, it also requires an accessor above and beyond the accessor required by the content 1040a. As opposed to the embodiment in FIG. 9, the trak structure 1007a identifies another trak as specific to metadata. This structure additionally provides for recursive metadata, e.g., the metadata can have its own metadata.

Furthermore, neither the embodiments of FIG. 9 or FIG. 10 are limited to a single non-text metadata. For instance, annotating audio and an author image may be included in the metadata. A decoding device, depending on configuration, may invoke both accessors such that they operate on their respective content, or can provide a user with the option of displaying/playing the metadata in addition or, or instead of, the main content.

Note that although distinct examples of container formats are provided in FIGS. 5-10, it should be understood that various features of each of FIGS. 5-10 may be combined with other features disclosed in other of FIGS. 5-10 where appropriate as one of skill in the art may judge. For example, the bvriInfoEntry 610b iinf/iloc indicator of content may be used in place of the minf indicators within boxes 708, 808, 858, 908, 1008a, and 1008b. As another example, text or XML metadata may be packaged with a text or XML accessor, respectively, in the manner indicated for audio and other non-text content in FIG. 9. Similarly, a bvriInfoEntry may provide information on the link between several tracks (for instance a document could be stored on several tracks). In addition, a bvriInfoEntry could be used to point to extra information in the mdat for one particular track.

Figure 11:
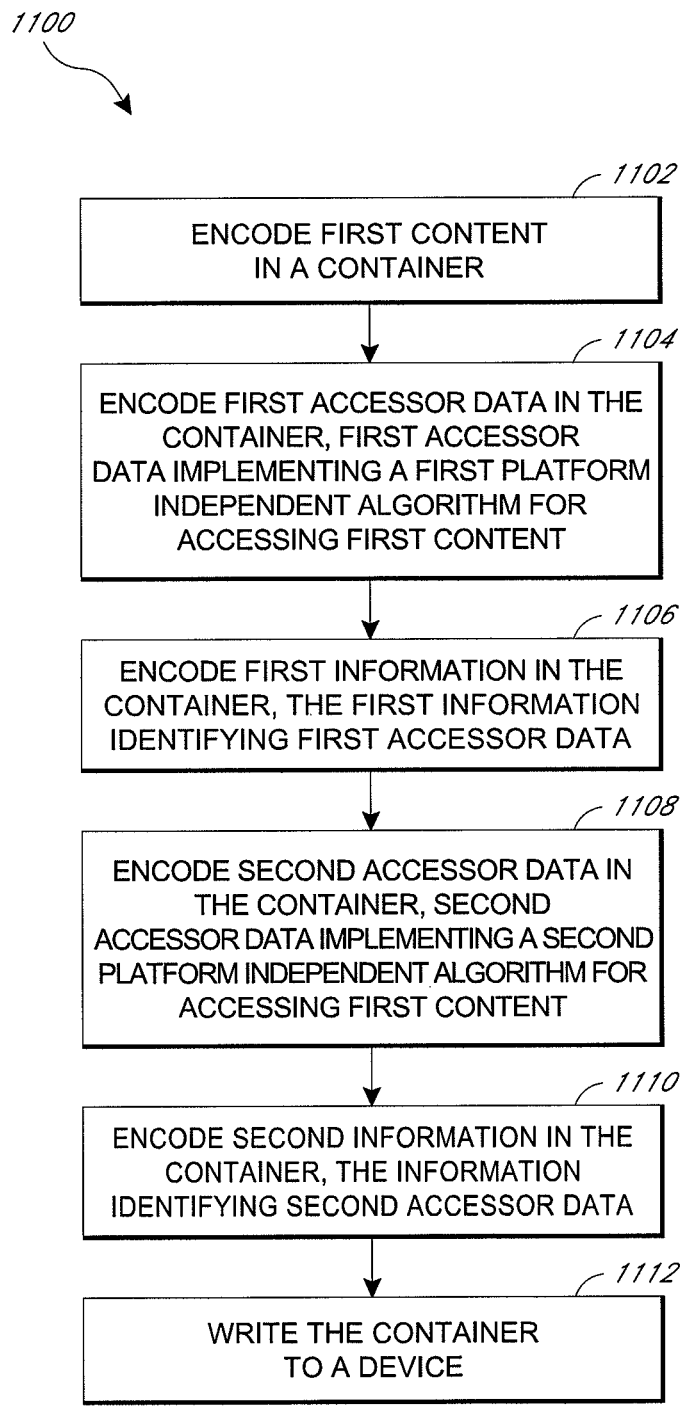
FIG. 11 is a flowchart of one exemplary method of encoding an ISO-BMFF container.

FIG. 11 is a flowchart of one exemplary method of encoding a container. The method 1100 may be used to encode at least any of the container formats described above in FIGS. 4-10. While the description of method 1100 below describes a representative subset of features of a method of encoding the container formats described in FIGS. 4-10, one of skill in the art would understand generally how to extend method 1100 to further encode the container formats of FIGS. 4-10 as needed, based at least on the descriptions above. In some aspects, the method 1100 may be performed by the apparatus 200.

In block 1102, first content is encoded in the container. The content of the disclosed methods and systems may include any type of data. For example, content may include text data, word processing data such as .doc or .rtf files, spreadsheets, video and/or audio data. Content may also include data formatted as a container. For example, content may be one or more of MP4, Advanced Systems Format, DivX Media Format, EVO, Flash Video, 3GP, 3G2, AVI, MPEG Video File, MPEG program stream, MPEG transport stream, Ogg, QuickTime, and/or Real Networks container format data. The content may also include scientific data or similar data.

In some aspects, the container is an International Organization for Standardization Base Media File Format (ISO- BMFF) container. In these aspects, the first content may be encoded in a mdat box of the ISO-BMFF container. In some aspects, a track ("trak") box is generated in the ISO-BMFF container to identify the first content's location and length within the mdat box.

For example, the trak box may be generated to include an mdia box, which is generated to include a minf box. The minf box may include information that identifies a starting position of the first content based on an offset from a beginning of the container 501, and a length within the mdat box of the first content (see for example, FIG. 5, with minf box 511 identifying the location of content 540).

In some other aspects, the trak box may be generated to identify an iloc box within a meta box of the enhanced ISO-BMFF container The iloc box may be generated to identify an offset from a beginning of the container 601 and length within the mdat box that contains the first content. (see for example, FIG. 6, where iloc box 644*b* identifies the location of content 640).

In block 1104, first accessor data is encoded in the container, with the first accessor data including or implementing a first platform independent algorithm for accessing first content. In some aspects, the first accessor data may be a bytecode such as Java® bytecode. In some other aspects, first accessor data may be common intermediate language (CIL). In some other aspects, first accessor data may be any platform independent intermediate language. In some aspects, first accessor data may be a platform independent source code, such as perl source code, python source code, ruby source code, or C source code. The algorithm implemented by the first accessor data may receive at least one input parameter. The at least one input parameter identifies (for example, via a pointer) content that the algorithm will process. In aspects encoding an enhanced ISO-BMFF container, the first accessor data may be encoded in an mdat box of the ISO-BMFF container.

In block 1106, first information identifying the first accessor data is encoded in the container. In aspects encoding an enhanced ISO-BMFF container, a meta box may be generated to identify an offset from the beginning of the container and a length of the first accessor data. For example, an iloc box may be generated within the meta box to identify the location and size of the first accessor data (see for example, FIG. 5, iloc box 525).

In some aspects, a trak box is generated within the ISO-BMFF container to identify the first accessor data. For example, a mdia box may be generated within the trak box. The mdia box may include data that indicates the iloc box discussed above that identifies the first accessor data. For example, in some aspects, a new box, identified via a unique box identifier not already assigned to a known box type, may be generated within the mdia box. The new box (referred to above as a "bvri" box), may include one or more item info entries that point to or otherwise identify a iloc box and an iinf box that identifies the location and size of the first accessor data and may provide further information, such as versioning or checksums about the first accessor data in the mdat box.

Some aspects further encode information relating to a version of the first accessor data in the container. For example, in aspects encoding an enhanced ISO-BMFF container, a trak box may be further generated to include the version information. In some aspects, the version information may relate a version of a programming or intermediate language used by first accessor data. This version information may be used by a decoder of the container to determine whether a decoder accessor execution engine can support invocation of an algorithm implemented by first accessor data. For example, if the version of the decoder accessor execution engine is greater than or equal to a version indicated in the container, then the invocation can be supported in some aspects. If the version of first accessor data exceeds that of the decoder accessor execution engine, than perhaps invocation of first accessor data cannot be supported by the decoder's accessor execution engine in some aspects. Information relating to a version of the first accessor data may be encoded, in some aspects implementing an enhanced ISO-BMFF container, in an ItemInfoEntry of an iinf box. For example, an item type entry may be utilized to encode this information.

In some aspects, information relating to a version of content processed by the first accessor may be encoded in the container. This version information may be utilized by a decoder to determine whether an accessor capable of decoding content included in a container is already loaded or configured. For example, if an accessor corresponding to the version of content indicated in a container is already loaded in memory and ready for execution by the accessor execution engine, the loaded accessor may be invoked on the content, instead of re-loading the first accessor from the container (again).

Some aspects further include format information in the container. For example, a checksum or other hash of one or more data in the container may be encoded. Some aspects of process 1100 include performing a hash or checksum operation on the first accessor data (and in some aspects, also on content associated with the first accessor data) and encoding the hash or checksum in the container. For example, in some aspects implementing an enhanced ISO-BMFF container, a bvri box may indicate a checksum or hash of the first accessor data as discussed in the examples above. In some aspects, the checksum or hash may be indicated by the bvri box via identification of one or more iinf entries in the meta box. The iinf entries may contain the checksum or hash information for the first accessor data.

Some aspects of process 1100 include block 1108, which encodes second accessor data in the ISO-BMFF container. The second accessor data also implements a second platform independent algorithm for accessing first content. Similar to first accessor data, second accessor data may be bytecode, CIL, or any other platform independent intermediate language. Second accessor data may also be a platform independent source code. In aspects encoding an enhanced ISO-BMFF container, the second accessor data may also be encoded within an mdat box of the enhanced ISO-BMFF container.

In aspects of process 1100 that include block 1108, block 1110 is also included. In block 1110, second information identifying the second accessor data is encoded in the container. In some aspects encoding an enhanced ISO-BMFF container, the second accessor data may be identified in the ISO-BMFF container via any of the accessor identifying structures described above in FIGS. 5-10. For example, the meta box generated in block 1106 in these aspects may be further generated to identify an offset from a beginning of the container and length and other information of the second accessor data in the mdat box. A second iinf box may be generated within the meta box, with the second iinf box including information relating to the second accessor data. (See for example, box 734*b* of FIG. 7). A second iloc box may be generated within the meta box to identify the location and size of the second accessor data (see for example, iloc box 744*b* of FIG. 7).

In some aspects, a trak box within a ISO-BMFF container identifies the second accessor data. In some aspects, this track box is the same track box that identified the first accessor data (see for example, FIG. 7, track box 707, which identifies both accessor 735a and 735b). In aspects where the second accessor may also access a second content, a second track box is generated that identifies the second accessor.

If a second trak box is generated to identify the second accessor data, a second mdia box may be generated within the second trak box. Either the first mdia box discussed above or the second mdia box may include data that indicates the iinf box and the iloc box discussed above to identify the second accessor data. For example, in some aspects, a new box, identified via a unique box identifier not already assigned to a known box type, may be generated within the mdia box. The new box (referred to above as a "bvri" box), may include one or more item info entries that point to or otherwise identify a second iloc box that identifies the location and size of the second accessor data in the mdat box. In some aspects, the second accessor may annotate first content using second content, where second content is associated with the second trak box.

In block 1112, the container is written to a device. In some aspects, the device may be a storage device. For example, the container may be written to a database via a database system. The container may be written to a hard disk or other stable memory via a file system. In some aspects, the container is streamed over a network. In some aspects, the container is streamed to a decoder, such as a decoder performing process 1200, described with respect to FIG. 12 below.

In some aspects, data within the container may be encoded in an order that considers how a decoder can most efficiently process the encoded data. For example, some aspects of process 1100 may encode and stream moov boxes before an mdat box is encoded and streamed into the container. This allows a decoder to receive and decode at least portions of the moov boxes before the mdat box is received. The decoder can then utilize the information within the moov box to select particular portions of the mdat box, for example, particular accessors corresponding to content identified by the received moov boxes. The accessor(s) can then be invoked, if necessary, from a first portion of the mdat box before the remainder of the mdat box is received. In some aspects, metainformation may be placed within the moov box so that the container is streaming-compliant.

Figure 12:
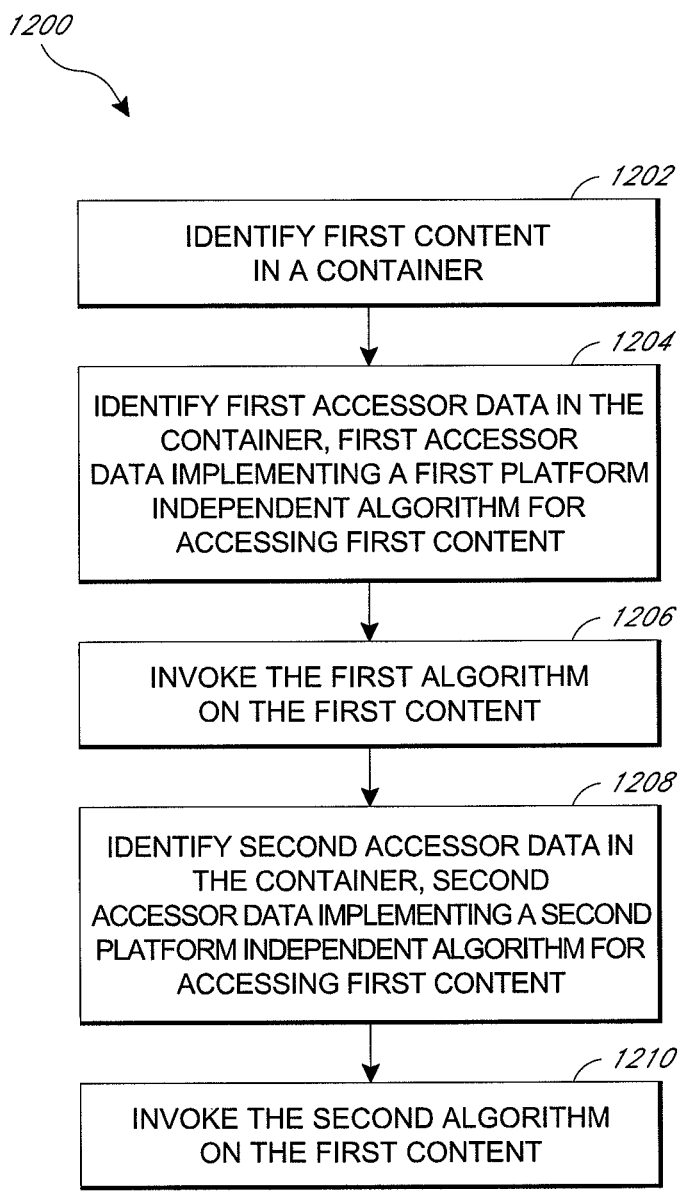
FIG. 12 is a flowchart of one exemplary method of decoding an ISO-BMFF container.

FIG. 12 is a flowchart of one exemplary method of decoding a container. The method 1200 may be used to decode any of the container formats described above in FIGS. 4-10. While the description of method 1200 below describes a representative subset of features of a method of decoding the container formats described in FIGS. 4-10, one of skill in the art would understand generally how to extent method 1200 to further decode the container formats of FIGS. 4-10 as needed, based at least on the descriptions above. In some aspects, the method 1200 may be performed by the apparatus 250.

The packaged encoded data and accessor functionality can be utilized in multiple ways. Since the encoded digital data are packaged in an mdat box, they may be extracted for use in any software packages that are configured to handle their associated encoding format. Alternatively, the packaged accessor functionality can be used to access (decode or interpret) the encoded digital data. In one embodiment, a software program reads the bvri boxes, extracts one or more accessors and any associated metadata, invokes the one or more accessors, extracts one or more portions of encoded digital data from one or more traks and accesses, plays back, or displays the decoded/interpreted digital data.

In block 1202, first content is identified in a container. In some aspects that decode an enhanced ISO-BMFF container, identifying first content may include parsing the ISO-BMFF container to identify a trak box. The trak box may be parsed to identify an mdia box. The mdia box may be parsed to identify a minf box. The minf box may be parsed or decoded to identify information identifying where the first content is stored in the ISO-BMFF container. For example, the first content may be stored within an mdat box of the ISO-BMFF container. The identifying information within the minf box may include an offset from the beginning of the container where the first content begins. Length information for the first content may also be included in the minf box. Alternatively, in some aspects, an iloc box is identified by parsing a bvri box as shown above for example in FIG. 6. The iloc box is then decoded to identify a location of the content, which may be within an mdat box of the container as discussed above. For example, the identification of the location may be based on an offset and length provided by the iloc box.

In block 1204, first accessor data is identified in the container. The first accessor data implements a first platform independent algorithm for accessing the first content.

In some aspects that decode an enhanced ISO-BMFF container, first accessor data may be identified based on the existence of a particular box in an ISO-BMFF container. For example, a mdia box containing a bvri box may indicate the existence of an accessor in some aspects. The bvri box may include one or more item info entries identifying other boxes that provide information as to a particular location and size of the first accessor data within an mdat box of the ISO-BMFF container. For example, as shown in FIG. 5, a bvri box may include an item info entry that identifies or points to an iinf box 523 and an iloc box 525 within the ISO-BMFF container. In some aspects, the bvri box, and the iloc box may be parsed to identify the location of the first accessor data within the mdat box.

Some aspects further decode information relating to a version of the first accessor data from the container. The version information may relate a version of a bytecode or programming language (be intermediate, source, etc) used by first accessor data. This information may be used by a decoder of the container to determine whether a decoder accessor execution engine can support invocation of an algorithm implemented by first accessor data. For example, if the version of the decoder accessor execution engine is greater than or equal to a version indicated in the container, then the invocation can be supported. For example, block 1206 may be performed below. If the version of first accessor data exceeds that of the decoder accessor execution engine, than perhaps invocation of first accessor data cannot be supported by the decoder's accessor execution engine. In this case, block 1206 may not be performed.

In some aspects that decode an ISO-BMFF container, the version information is decoded from the trak box. For example, the version information may be decoded from an item info entry in an iinf box identified by the trak box. The trak box may identify the iinf box via a bvri box in some aspects, such as those shown above.

In some aspects version information may indicate the version or other identifying information of the accessor itself. If the accessor version information indicates an accessor that has previously been invoked and still resides in an executable memory of the accessing/decoding device, then the accessor does not need to be parsed from the container and invoked. Instead, the resident accessor may be invoked.

Some aspects further decode format information from the container. For example, a checksum or other hash of one or more data in the container may be decoded. Some aspects of process 1200 include identifying a hash or checksum of first accessor data and/or the first content from the container. A hash of the first accesssor data may then be determined and compared to the hash included in the container. Invocation of the first accessor may then be based on the comparison.

In some aspects that decode an ISO-BMFF container, the hash or checksum is decoded from an iinf entry identified by the bvri box discussed above. In other aspects, the hash or checksum is decoded from a bvri info entry in the bvri box discussed above. For example, in some aspects, the bvri box may indicate a checksum or hash of the first accessor data. The checksum or hash may be indicated by the bvri box via identification of one or more iinf entries in a meta box. In some aspects, the iinf entries may contain the checksum or hash information for the first accessor data and/or the first content.

In block 1206, the first algorithm is invoked on the first content. In some aspects, once the first accessor data is identified, it may be optionally loaded into an accessor execution engine appropriate for it. For example, if the first accessor data is java bytecode, the first accessor data may be passed to a Java Virtual Machine, where it is executed. Alternatively, the accessor execution engine may execute the first accessor data directly from the container in some aspects.

At least one input parameter may be passed to the first algorithm when it is invoked. This input parameter identifies the first content. For example, a pointer to the first content or the first content itself may be passed to the first algorithm as an input parameter.

In some aspects, the first content may be container data, such as ISO_BMFF, MP4, Advanced Systems Format, DivX Media Format, EVO, Flash Video, 3GP, 3G2, AVI, MPEG Video File, MPEG program stream, MPEG transport stream, Ogg, QuickTime, or Real Networks. In these aspects, invoking the first accessor may extract content from the first content and then may then further access the extracted content. For example invoking the first accessor may extract video data from a QuickTime container and then run a video player on the video data.

Blocks 1208-1210 may be optionally performed as part of process 1200. In block 1208, second accessor data is identified within the container. The second accessor data implements a second platform independent algorithm for accessing first content.

Second accessor data may be identified similarly to first accessor data discussed above. For example, in aspects that decode an ISO-BMFF container, the bvri box discussed above may include a second item info entry that identifies one or more of a second iinf box and second iloc box in the meta box. The second iinf box and second iloc box may identify a location of the second accessor within the mdat box of the ISO-BMFF container. Because both the first accessor and the second accessor access the first content, the first accessor and the second accessor are associated with the first content in ISO-BMFF aspects, based on both accessors being identified by a single trak box.

In optional block 1210, the second algorithm is invoked on the first content. This may operate in a similar manner as discussed above with respect to block 1206 and the first accessor.

Figure 13:
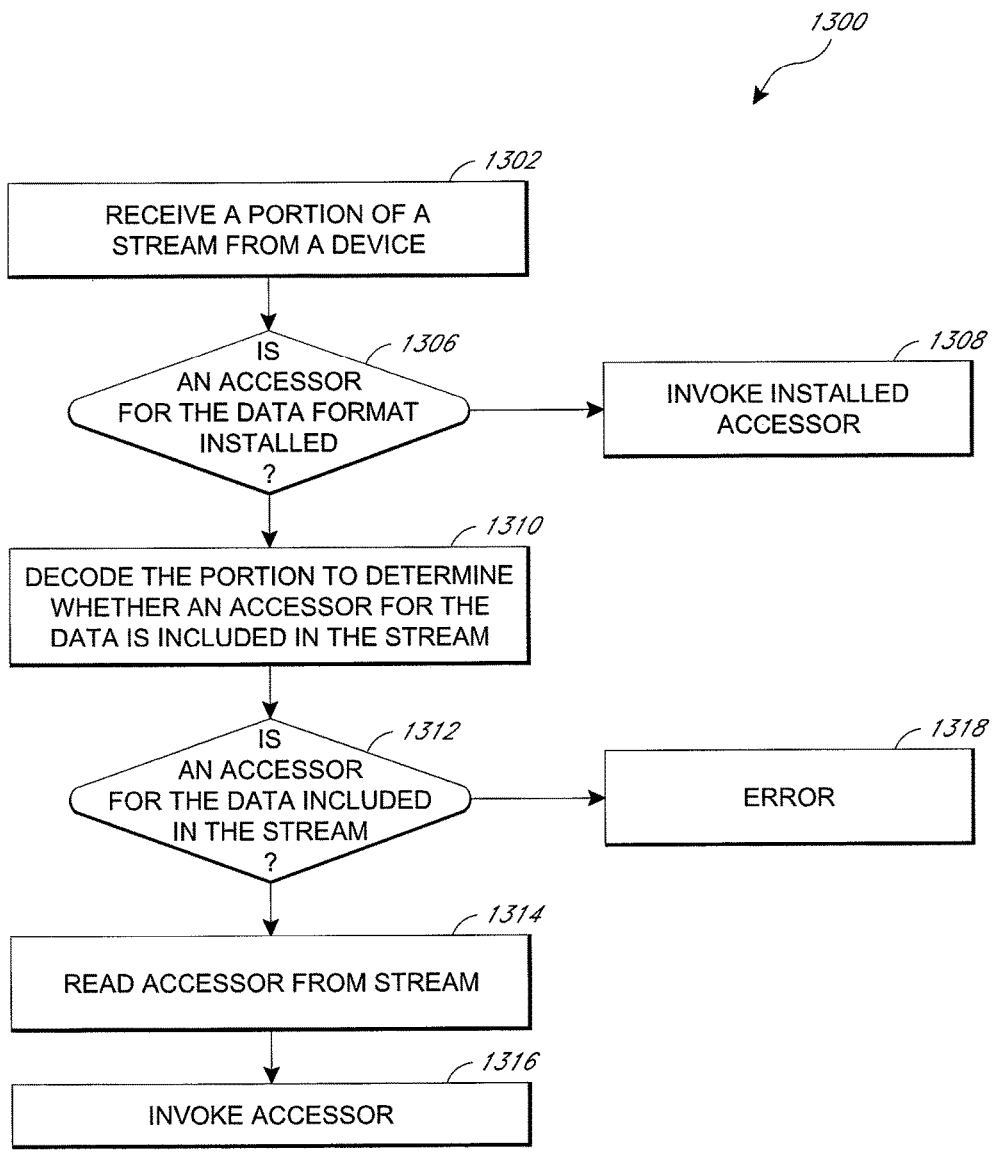
FIG. 13 is a flowchart of one exemplary method of invoking a data accessor on content contained in an ISO-BMFF container.

FIG. 13 is a flowchart of a method of invoking a data accessor on content contained in an ISO-BMFF container. Process 1300 may decode any of the ISO-BMFF formats described above in FIGS. 4-10. Process 1300 may be performed, in some aspects, by the apparatus 250.

In block 1302, a portion of a stream is received from a device. In some aspects, the device may be a storage device, such as a hard-disk or memory disk. In some aspects, the device may be network. In some aspects, the device may be the apparatus 265 of FIG. 3. In some aspects, the portion is a portion of an ISO-BMFF container, such as one of the ISO-BMFF containers discussed above with respect to FIGS. 4-10.

Decision block 1306 determines whether an accessor for the data format is installed. Installed in this context may include whether an accessor for the data format is currently loaded into a memory space such that it can be efficiently invoked as compared to loading the accessor from the stream. In some other aspects, whether an accessor is installed may relate to whether an operating system on a device performing process 1300 provides an association between the format of the data and a program that can be executed by the device. In some other aspects, whether an accessor is installed may relate to whether the installation is recorded in a data store. In some aspects, whether an accessor of the data format is installed may relate to version information included in the container. As discussed above in the ISO-BMFF container format examples, the container may include version information of content, with the version information identifying an accessor that is capable of decoding/accessing the content. If an accessor corresponding to the specified version information is available to be invoked, then block 1306 may determine that an accessor for the data format is installed, at least in some aspects.

If the accessor for the data format is installed, block 1308 invokes the installed accessor. If the accessor for the data is not installed, the portion of the stream is further decoded to determine whether an accessor for the data is included in the stream in block 1310. For example, as described with respect to FIG. 12, the stream may be decoded to determine whether a bvri box identifies an accessor for the data. If no accessor is provided, an error condition is raised in block 1318.

If the stream provides an accessor, the accessor is read from the stream in block 1314. In some aspects, the accessor is read from an mdat box included in the stream. For example, in various aspects, the accessor may be read from any of the ISO-BMFF containers described above with respect to FIGS. 4-10. In block 1316, the accessor is invoked. The accessor may be passed an input parameter that identifies the associated content.

The technology is operational with numerous other general purpose or special purpose computing system environments or configurations. Examples of well-known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN), personal area network (PAN), or Wide Area Network (WAN) may be a home or corporate computing network, including access to the Internet, to which computers and computing devices comprising the system are connected. In one embodiment, the LAN conforms to the Transmission Control Protocol/Internet Protocol (TCP/IP) industry standard.

As used herein, multimedia, multimedia data, digital data, and digital multimedia refer to images, graphics, sounds, video, animations, electronic documents, scientific data, or any other digital data type data that is entered into the system.

As used herein, encoded digital data refers to data that are stored or held in a data format, which may be compressed or uncompressed. As used herein, decoding may refer to decompression, interpretation, playback or conversion.

As used here-in, platform independent may refer to an ability to operate independently of which hardware platform is being used. Generally, platform independent applications or accessors do not include hardware processor instructions. Therefore, a compiled Microsoft Windows application is not platform independent, for example, because it includes processor instructions specific to its intended platform. This is true even though emulators are available to enable such an application to run on platforms other than that for which the application was originally compiled. Because platform independent applications do not include hardware processor instructions, platform independent applications generally are invoked by at least a minimal "execution engine" that can translate platform independent instructions into instructions specific to the platform upon which the application is being run. For example, a Java Virtual machine invokes a Java program by translating java byte codes into hardware instructions at run time. Note that the translation discussed here does not need to occur literally, but may result from platform independent instructions invoking or causing particular platform specific instructions of the execution engine to be executed.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system is comprised of various modules/components as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

A web browser comprising a web browser user interface may be used to display information (such as textual and graphical information) to a user. The web browser may comprise any type of visual display capable of displaying information received via a network. Examples of web browsers include Microsoft's Internet Explorer browser, Netscape's Navigator browser, Mozilla's Firefox browser, PalmSource's Web Browser, Apple's Safari, or any other browsing or other application software capable of communicating with a network.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the above description has pointed out novel features of the technology as applied to various embodiments, the skilled person will understand that various omissions, substitutions, and changes in the form and details of the device or process illustrated may be made without departing from the scope of the instant technology. Therefore, the scope of the technology is defined by the appended claims rather than by the foregoing description. All variations coming within the meaning and range of equivalency of the claims are embraced within their scope.

What is claimed is:

1. A method of forming a first container for a plurality of digital data elements, the first container being defined by a first container metafile format and comprising a plurality of data elements and metadata for those data elements organized according to the first container metafile format, the method comprising:
    forming the first container in the first container metafile format to include a first data element, the first data element comprising first media content encoded in a first media encoding format;
    forming the first container in the first metafile format to also contain a second data element, the second data element comprising first accessor data, the first accessor data being different from the first media content and implementing a platform independent first algorithm configured to decode the first media content from its encoded state in the container for playback when retrieved from the container; and
    writing the container to a device.

2. The method of claim 1, further comprising forming the first container in the first metafile format to also contain a third data element, the third data element comprising second accessor data, the second accessor data being different from the first media content and different from the first accessor data, the second accessor data implementing a platform independent second algorithm configured to decode the first media content from its encoded state for playback.

3. The method of claim 1, further comprising:
    determining a hash for at least the first accessor data; and
    forming the first container in the first metafile format to also contain a third data element, the third data element comprising the hash for at least the first accessor data.

4. The method of claim 1, further comprising:
    determining an accessor version of the first accessor; and
    forming the first container in the first metafile format to also contain a third data element, the third data element comprising the accessor version.

5. The method of claim 4, wherein determining a version of the first accessor comprises determining a version of codewords included in the first accessor data.

6. The method of claim 1, further comprising:
    determining a content version of the first media content; and
    forming the first container in the first metafile format to also contain a third data element, wherein the third data element comprises the content version of the first media content.

7. The method of claim 1, further comprising forming the first container as an International Organization for Standardization Base Media File Format (ISO-BMFF) container.

8. The method of claim 7, further comprising:
forming the first container such that a first indication of the first accessor data and a second indication of the first content are stored in a first trak box of the container; and
forming the first container such that a third indication of a second content and a fourth indication of second accessor data are stored in a second trak box of the container.

9. The method of claim 7, further comprising forming the first container such that a first iloc box of the ISO-BMFF container identifies the first accessor data.

10. The method of claim 8, further comprising forming the first container such that a second iloc box of the ISO-BMFF container identifies the second accessor data.

11. An apparatus for forming a first container for a plurality of digital data elements, the first container being defined by a first container metafile format and comprising a plurality of data elements and metadata for those data elements organized according to the first container metafile format, the apparatus comprising:
a processor configured to:
form the first container in the first container metafile format to include a first data element, the first data element comprising first media content encoded in a first media encoding format,
form the first container in the first metafile format to also contain a second data element, the second data element comprising first accessor data, the first accessor data being different from the first media content and implementing a platform independent first algorithm configured to decode the first media content from its encoded state for playback; and
write the container to a device.

12. The apparatus of claim 11, wherein the processor is further configured to form the first container in the first metafile format to also contain a third data element, the third data element comprising second accessor data, second accessor data implementing a platform independent second algorithm configured to decode the first media content from its encoded state for playback.

13. The apparatus of claim 11, wherein the processor is further configured
determine a hash for at least the first accessor data; and
form the first container in the first metafile format to also contain a third data element, the third data element comprising the hash.

14. The apparatus of claim 11, wherein the processor is further configured
determine an accessor version of the first accessor; and
form the first container in the first metafile format to also contain a third data element, the third data element comprising the accessor version.

15. The apparatus of claim 11, wherein the processor is further configured
determine a content version of the first media content; and
form the first container in the first metafile format to also contain a third data element, the third data element comprising the content version.

16. The apparatus of claim 11, wherein the processor is further configured to form the first container as an International Organization for Standardization Base Media File Format (ISO-BMFF) container.

17. The apparatus of claim 16, wherein the processor is further configured
form the first container such that a first indication of the first accessor data and a second indication of the first content are stored in a first trak box of the container; and
form the first container such that a third indication of a second content and a fourth indication of second accessor data are stored in a second trak box of the container.

18. The apparatus of claim 16, wherein the processor is further configured to form the first container such that a first iloc box of the ISO-BMFF container identifies the first accessor data.

19. The apparatus of claim 16, wherein the processor is further configured to form the first container such that a second iloc box of the ISO-BMFF container identifies the second accessor data.

20. The method of claim 1, wherein the first media content encoded in a first media encoding format is contained in a second container defined by a second metafile format, and wherein the first accessor data implements a second platform independent algorithm configured to extract the first media content encoded in a first media encoding format from the second container.

21. The apparatus of claim 11, wherein the first media content encoded in a first media encoding format is contained in a second container defined by a second metafile format, and wherein the first accessor data implements a second platform independent algorithm configured to extract the first media content encoded in a first media encoding format from the second container.

* * * * *